United States Patent
Lin et al.

(10) Patent No.: US 8,266,150 B1
(45) Date of Patent: Sep. 11, 2012

(54) SCALABLE DOCUMENT SIGNATURE SEARCH ENGINE

(75) Inventors: Yingqiang Lin, San Jose, CA (US); Liwei Ren, Sunnyvale, CA (US); Dehua Tan, San Jose, CA (US)

(73) Assignee: Trend Micro Incorporated, Tokyo (JP)

( * ) Notice: Subject to any disclaimer, the term of this patent is extended or adjusted under 35 U.S.C. 154(b) by 466 days.

(21) Appl. No.: 12/364,134

(22) Filed: Feb. 2, 2009

(51) Int. Cl.
G06F 17/30 (2006.01)
G06F 7/00 (2006.01)

(52) U.S. Cl. .................................. 707/741; 707/830

(58) Field of Classification Search .......... 707/660–675, 707/741, 830
See application file for complete search history.

(56) References Cited

U.S. PATENT DOCUMENTS

| | | | |
|---|---|---|---|
| 6,493,709 B1 | 12/2002 | Aiken | |
| 7,031,972 B2 | 4/2006 | Ren et al. | |
| 7,516,130 B2 | 4/2009 | Ren et al. | |
| 2003/0182310 A1* | 9/2003 | Charnock et al. | 707/104.1 |
| 2004/0199491 A1* | 10/2004 | Bhatt | 707/2 |
| 2006/0253439 A1 | 11/2006 | Ren et al. | |

OTHER PUBLICATIONS

Muhammad Sharif, et al. "Multiple Values Search Algorithm" 2007—Spring 2008, pp. 49-58, vol. 1, No. 2, Journal of Information & Communication Technology.

Chakrabarti, et al. "Scalable feature selection, classification and signature generation for organizing large text databases into hierachical taxonomies", 1998, pp. 163-178, vol. 7, No. 3, VLDB Journal.

Anagnostopoulos, A. et al., "Sampling Search-Engine Results," Proceedings of the 14th International Conference on World Wide Web, WWW 2005, May 10-14, 2005, pp. 245-256, Chiba, Japan.

Chen. J., et al., "Knowledge Discovery and Data MIning Based on Power Plant Real-Time Database: A Survey," Proceedings of International Conference on Power Engineering, Oct. 8-12, 2001, pp. 1-5, Xi'an, China.

Chen, L., et al., "Template Detection for Large Scale Search Engines," SAC '06, Apr. 23-27, 2006, 5 pages, Dijon, France.

Hamilton. N., "The Mechanics of a Deep Net Metasearch Engine," Proceedings of the 12th International World Wide Web Conference, 2003, 2 pages.

Jessop, M., et al., Pattern Matching Against Distributed Datasets, 2004, 6 pages.

Lai, W.C., et al., "An Anatomy of a Large-Scale Image Search Engine," IEEE MSE, Dec. 2002, 4 pages, Irvine.

Lavrenko, V., et al., "Relevance Models for Topic Detection and Tracking," 2002, 6 pages.

Pallickara, S. et al., "Incorporating an XML Matching Engine in Distributed Brokering Systems," Proceedings of the International Conference on Parallel and Distributed Processing Techniques and Applications, (PDPTA '03) 2003, pp. 1-7.

* cited by examiner

*Primary Examiner* — Hosain Alam
*Assistant Examiner* — Navneet K Ahluwalia
(74) *Attorney, Agent, or Firm* — Okamoto & Benedicto LLP

(57) ABSTRACT

A document signature index and search system is disclosed. The logical structure of the signature index that includes search tables is defined. Also specified is a system of creating, managing and using the signature index. The system includes an index engine and search engine. The search tables are compact in disk usage and suitable for differential computation, making large scale deployment feasible. With the introduction of meta-data and an algorithm of multiple value dual binary searching, the search engine based on the search tables is very efficient in searching for signatures from large search tables which may store millions of signatures. Other embodiments, aspects and features are also disclosed.

11 Claims, 20 Drawing Sheets

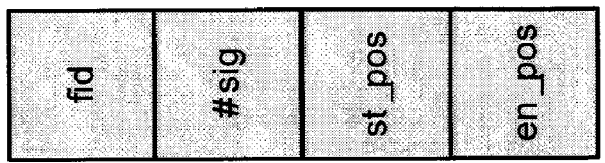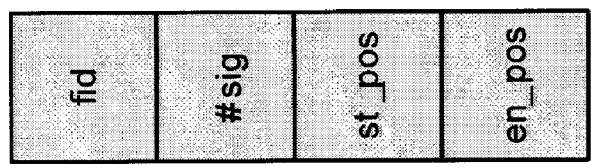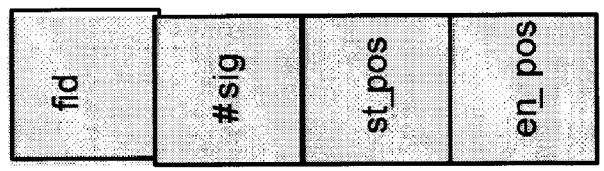
Index headers of fid-signature index
FIG. 8

<sig,fid> pairs of signature-fid index

SCALABLE DOCUMENT SIGNATURE SEARCH ENGINE

CROSS-REFERENCE TO RELATED APPLICATION(S)

The present application is related to co-pending U.S. application Ser. No. 11/361,340, "Matching Engine with Signature Generation," filed Feb. 24, 2006 by Liwei Ren et al., the disclosure of which is hereby incorporated by reference. The present application is also related to co-pending U.S. application Ser. No. 12/069,659, "Document Matching Engine with Asymmetric Signature Generation," filed Feb. 11, 2008 by Liwei Ren et al., the disclosure of which is hereby incorporated by reference.

BACKGROUND

1. Field of Art

The present invention generally relates to the field of search engine technologies with application, for example, to the area of data leakage prevention.

2. Description of the Related Art

Conventional Search Engines

In general, an enterprise search engine is a software system to search relevant documents with given query statements. The enterprise search engine typically consists of a crawler, an indexer, a searcher and a query engine. The crawler gathers documents from pre-assigned locations and dumps them into document repositories. The indexer fetches documents from the document repositories, creates indices from the documents, and stores the indices into an index database. The searcher searches the index database and returns a list of relevant documents (referenced as "hits") in response to a specific query. The query engine parses a query expression provided by a user and sends query commands to searcher for processing.

Consider, for example, the conventional search system 100 that is depicted in FIG. 1. The conventional search system 100 may fetch documents from one or more document sources 105(a-n) that are stored in a document repository 110. The documents from document sources 105(a-n) are indexed by a search engine 120, and the indexed documents 122 are stored in an index database 124.

Subsequently, a user 150 seeking information may use a query composer 130 to compose a query to search documents 126 in the search engine 120. The search may then be conducted by the search engine 120 against the indexed documents 122 in the index database 124. When a match or matches (i.e. "hits") are found corresponding to the query, the search engine 120 returns the matching indexed documents as search results 135 that are presented to the user 150.

SUMMARY

One embodiment relates to a computer apparatus for managing an index of documents. The apparatus includes data storage configured to store computer-readable instructions and data, and a processor configured to execute computer-readable instructions and to access said data storage. A file identifier-signature index is stored on the data storage, the file identifier-signature index comprising index headers and a signature array. In addition, a signature-file identifier index is stored on the data storage, the signature-file identifier index comprising signature and file identifier data pairs.

Another embodiment relates to a computer apparatus for determining whether an input document matches any document in a set of documents. The apparatus includes data storage configured to store computer-readable instructions and data, and a processor configured to execute computer-readable instructions and to access said data storage. Computer-readable code is configured to implement a search engine. The search engine is configured to apply a weak search if configured with a weak searching index from an index engine and to apply a strong search if configured with a strong searching index from the index engine, wherein both the weak and strong searching indices are derived from the set of documents.

Other embodiments, aspects and features are also disclosed.

BRIEF DESCRIPTION OF DRAWINGS

The disclosed embodiments have other advantages and features which will be more readily apparent from the following detailed description and the appended claims, when taken in conjunction with the accompanying drawings, in which:

FIG. 8 show the structure of an array of index headers in accordance with an embodiment of the invention.

DETAILED DESCRIPTION

Applicants have determined that the conventional search system discussed in the Background section has various limitations and inefficiencies. For example, the conventional search system lacks an accurate and efficient measurement of the document relevance. In addition, a conventional search system generally returns a large list of documents, most of which may not be relevant at all. Thus, the precision rate of retrieval is low. Returning a large list of documents is a common problem of conventional search engine technologies because the query presented by key terms is unable to precisely depict the documents that users are trying to retrieve. Another disadvantage with the direct application of conventional search systems is that they typically measure the relevance of documents through models that are often inaccurate or that are highly computing intensive. Examples of these inaccurate and resource intensive models include a term vector-space model, a probabilistic model, a latent semantic space model, and the like.

Furthermore, applicants have determined that the conventional data structure of a signature index has disadvantages and inefficiencies. These shortcomings include that the search performance may be slow for a conventional index structure. In addition, the conventional nonlinear index data structure is unsuitable for incremental signature updates based on delta technology. In addition, the index data takes up a large amount of disk space, and the search APIs (application programming interfaces) have a large footprint and so consumes a large amount of memory.

Matching Engine with Signature Generation

One approach to efficiently find highly-relevant documents is through application and use of signatures associated with a document. This approach is disclosed in co-pending U.S. application Ser. No. 11/361,340, "Matching Engine with Signature Generation," filed Feb. 24, 2006 by Liwei Ren et al.

Figure 1:
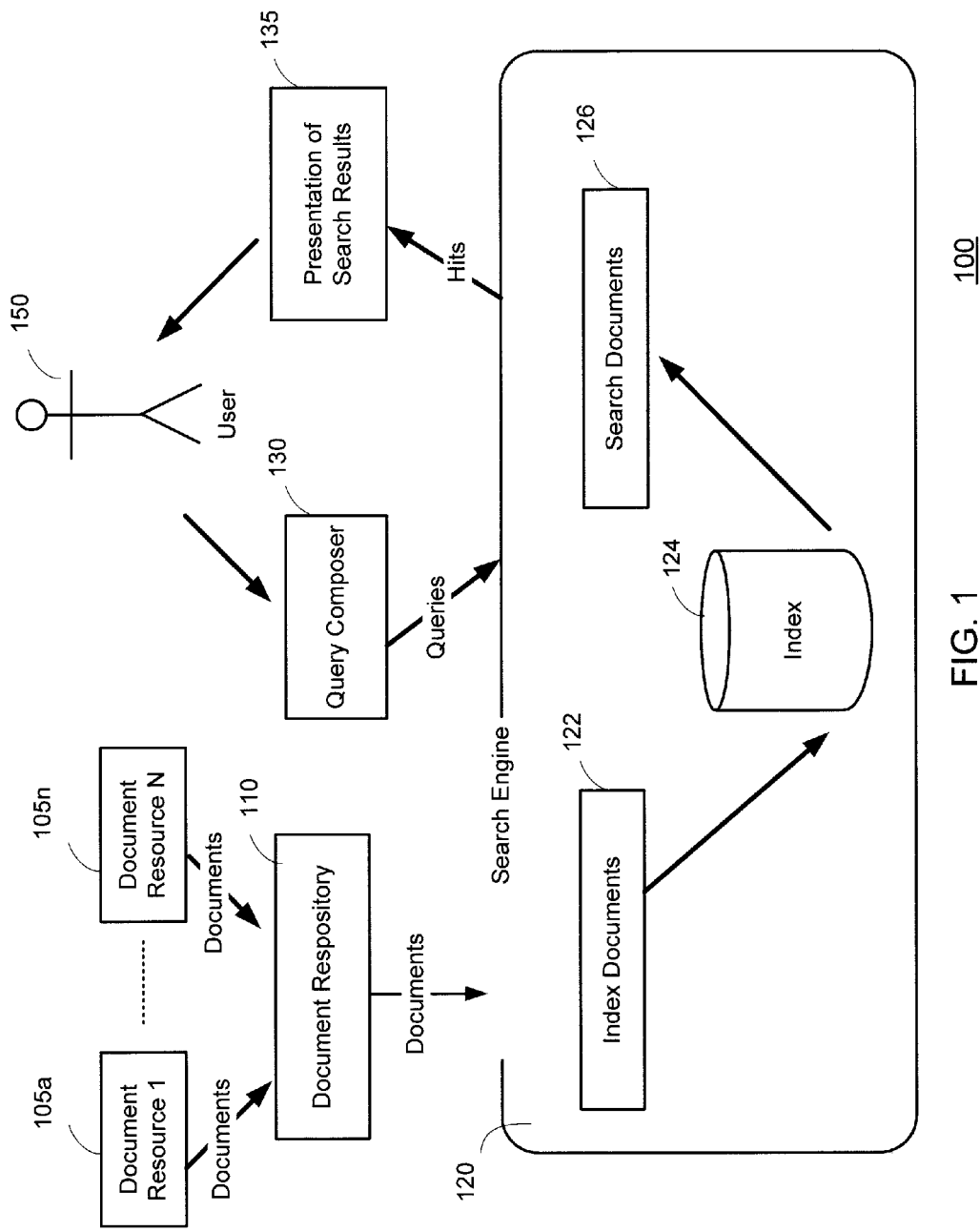
FIG. 1 illustrates an example of a conventional architecture of a search engine.
Figure 2A:
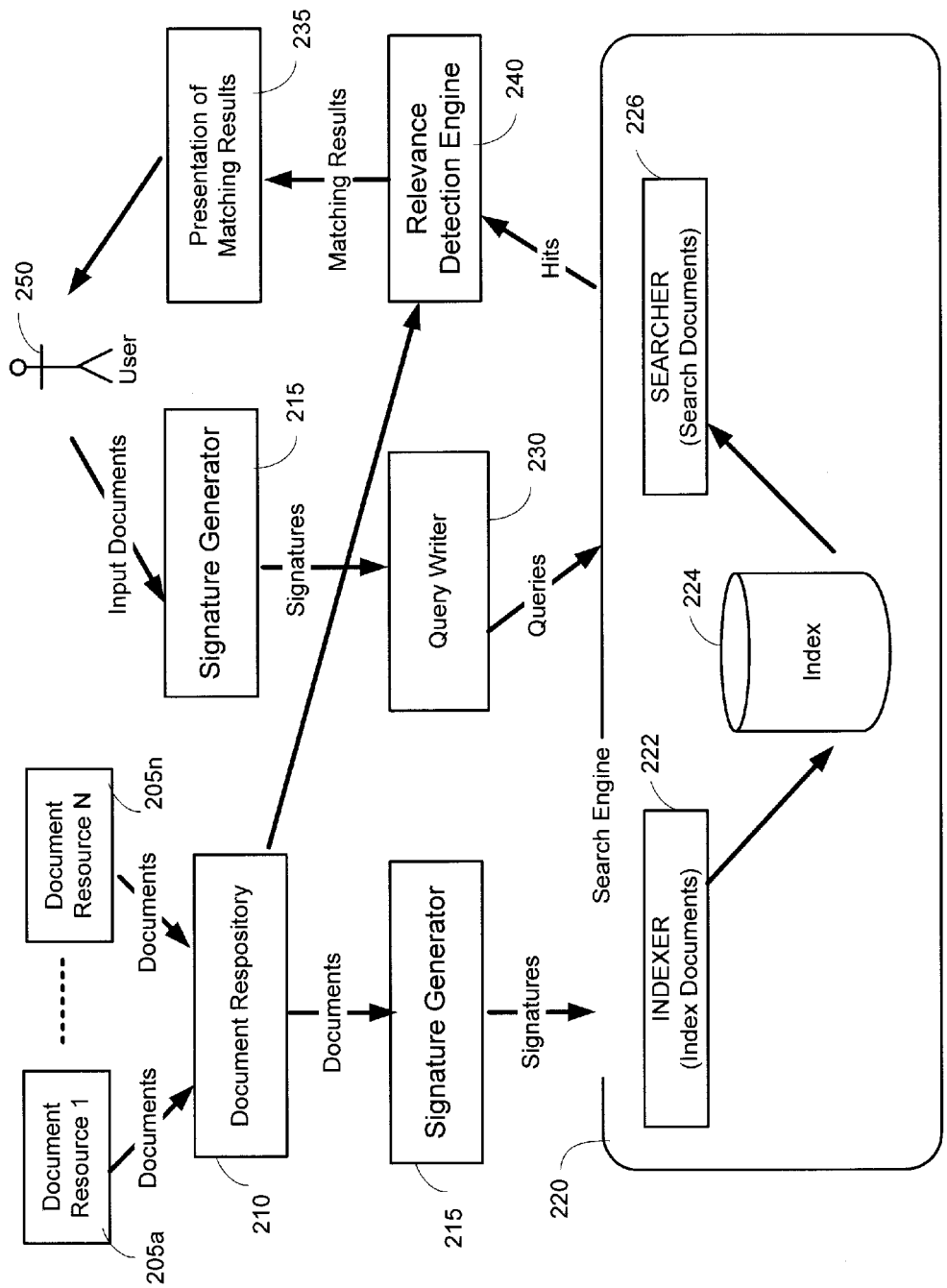
FIG. 2A depicts an embodiment of an architecture of a matching engine with signature generation.

FIG. 2A illustrates an architecture of a matching engine with signature generation, as disclosed in U.S. application Ser. No. 11/361,340. As shown in FIG. 2A, one or more document resources 205 (*a-n*) may be collected (or stored) in a document repository 210. Generally, the architecture is structured to pre-process the tokens from the document, select the most informative tokens, and, based on the informative tokens, generate signatures associated with the document. The architecture also is configured to ensure uniqueness of the generated signatures with respect to an input document context. The architecture is further configured to limit the number of signatures collected while keeping the stability of the collection across varied versions of the same document. It is noted that in one embodiment, the signature is a value, for example, a hash representation corresponding to particular information or a string of ASCII characters in accordance with the selected tokens.

Referring now to an embodiment of a process with respect to the architecture, initially it is noted that documents 205 may be collected manually or through use of a crawler. For example, a crawler may be configured to visit all assigned document sources to collect documents, assigns a unique document identifier (ID) to each document that is collected, and then place the unique document ID and document into the document repository 210.

A signature generator 215 generates a list of signatures from particular documents in the document repository 210. Signatures are strings or values that one makes from the unique information that represents a document. This representative information is unique to the document and stable when the document has moderate changes. The signature generator 215 may be configured to store one or more signature generation processes. The signature generator 215 may be further configured to select and execute one of the stored processes based on a type of document to be processed. For example, one embodiment of a signature generation process is adapted (configured) for use with English language documents, for example, in ASCII code, and is further described with respect to FIG. 3. The process can also apply to other languages that may use lower cases, stop-words and stemming, for example, Romance and Latin languages. Another embodiment of a signature generation process is adapted for use with documents in UTF-8 (universal transformation format) encoding for any language supported by Unicode, and is further described with respect to FIG. 4.

Once the signature generator 215 generates signatures for the particular document, an indexer 222 indexes the document with unique document identifier (ID) and the signatures generated by the signature generator 215. The result is an indexed document (by indexer 222) that is stored in an index database 224 of a search engine 220.

With the indexed document in the index database 224 of the search engine 220, the document is ready to be queried against. A user 250 may use a query writer 230 to compose a query expression based on the signatures generated by the signature generator 215. It is noted that the input document provided by a user 250 provides a query input. The user 250 does not need to know what the signatures are; rather, the user 250 only needs to know what the input document is. The user 250 passes the input document to signature generator 215. The signatures output from the signature generator 215 are passed to the query writer 230 for query composition. The composed query is then passed to a searcher 226 (search mechanism) for searching documents.

The searcher 226 in the search engine 220 searches the index database 224 using the query provided through the query writer 230. The searcher returns a list of possible relevant documents 226 ("hits") to a relevance detection engine 240. The relevance detection engine 240 calculates a relevance (e.g., in percentage terms) between the input document and the hits. The relevance detection engine 240 is configured to include one or more processes for a relevance calculation (or analysis). A first embodiment of a relevance detection process is further described with respect to FIG. 5. A second embodiment of relevance detection process is further described with respect to FIG. 6. It is noted that the relevance detection engine 240 can select and/or implement either of these processes. For example, for small documents, the first embodiment of the relevance detection process may be deployed and for larger documents, e.g., greater than 10 megabytes (MB) in size, the second embodiment of the relevance detection process may be deployed.

The matching engine architecture discussed above may be used to efficiently find a limited set of highly-relevant documents. For example, given a query to find documents related to document D with a relevance percentage X %, the matching engine efficiently searches a list of documents $\{D_1, \ldots,$ $D_b$} from a document repository and returns a set of documents from the list which have a relevance greater than X % in relation to document D.

Bandwidth Constraints and Scalability

While the matching engine architecture of FIG. 2A may be used to efficiently find a limited set of highly-relevant documents, there are shortcomings with the architecture. In particular, the architecture has limitations in relation to bandwidth constraints and scalability.

Figure 2B:
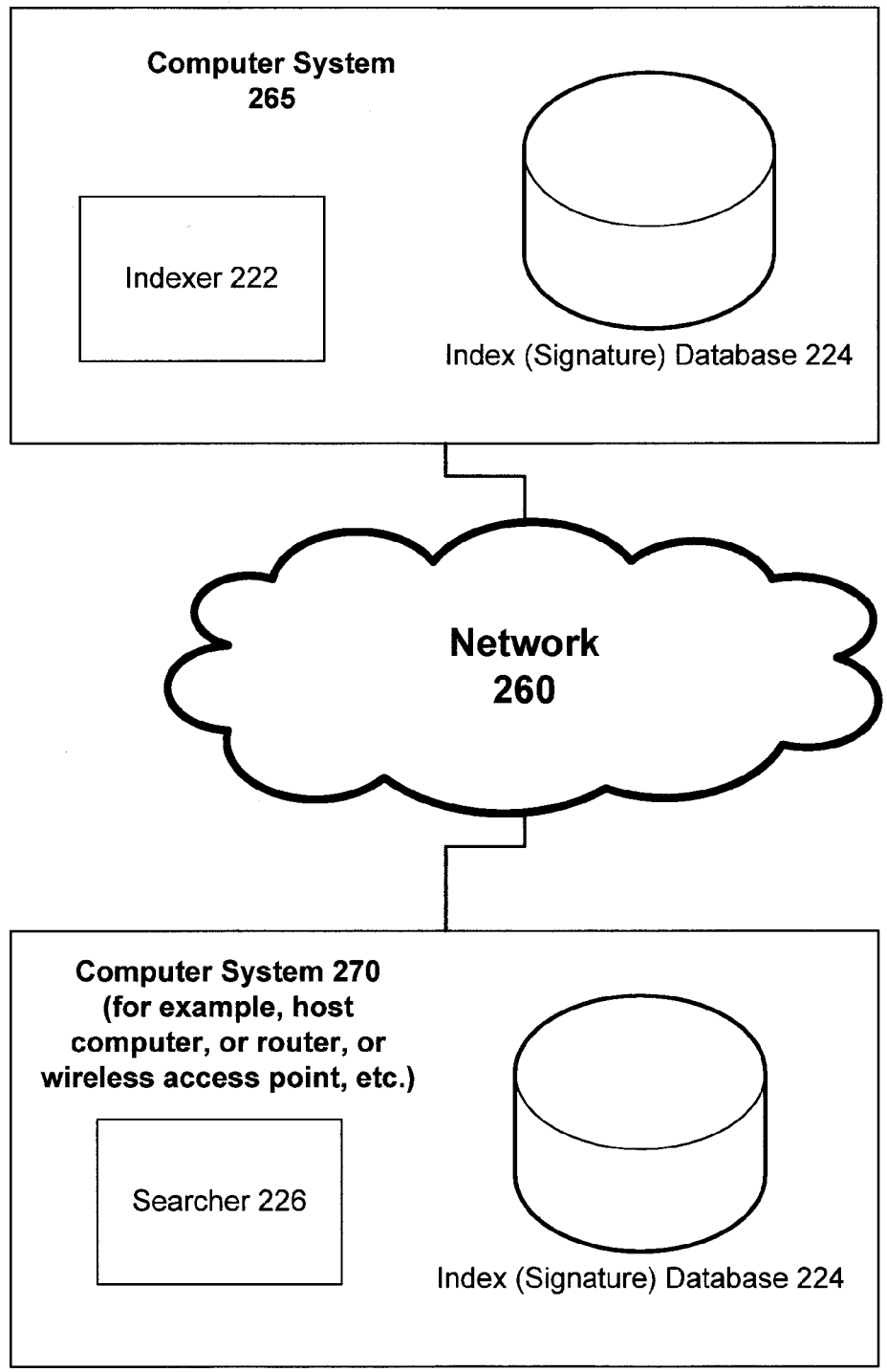
FIG. 2B illustrates deployment of the matching engine with signature generation in a distributed computing environment.

Consider the matching engine architecture in the context of a distributed computing environment. In other words, consider the case where the indexer 222 and the searcher 226 are deployed at different computer systems across a network 260. This case is depicted in FIG. 2B.

In this case, the signature (index) database 224 is generated at the computer system 265 of the indexer 222. However, the searcher 226 also needs access to the signature (index) database 224 in order to execute the document search queries. Therefore, a copy of the signature (index) database 224 needs to be downloaded to the computer system 270 of the searcher 226.

For example, in the context of a large corporate enterprise, the number of documents in the document depository may grow to be a very large number, for example, in excess of a million documents or more. As the number of documents indexed becomes larger and larger, the signature (index) database 224 becomes larger and larger. As such, the network bandwidth cost of downloading a large signature (index) database 224 may become prohibitive and problematic. In addition, the data storage space required at the computer system 270 of the searcher 226 to store a large signature (index) database 224 may also become prohibitive and problematic.

In other words, there are scalability limitations to the matching engine architecture of FIG. 2A. The present application discloses a solution which substantially improves the scalability of the matching engine.

Asymmetric Document Signature Generation

As seen from FIG. 2A, the matching engine architecture of FIG. 2A is symmetric in that the signature generator 215 is configured to be the same for both the indexer 222 and the searcher 226. The solution disclosed herein breaks that symmetry.

Figure 2C:
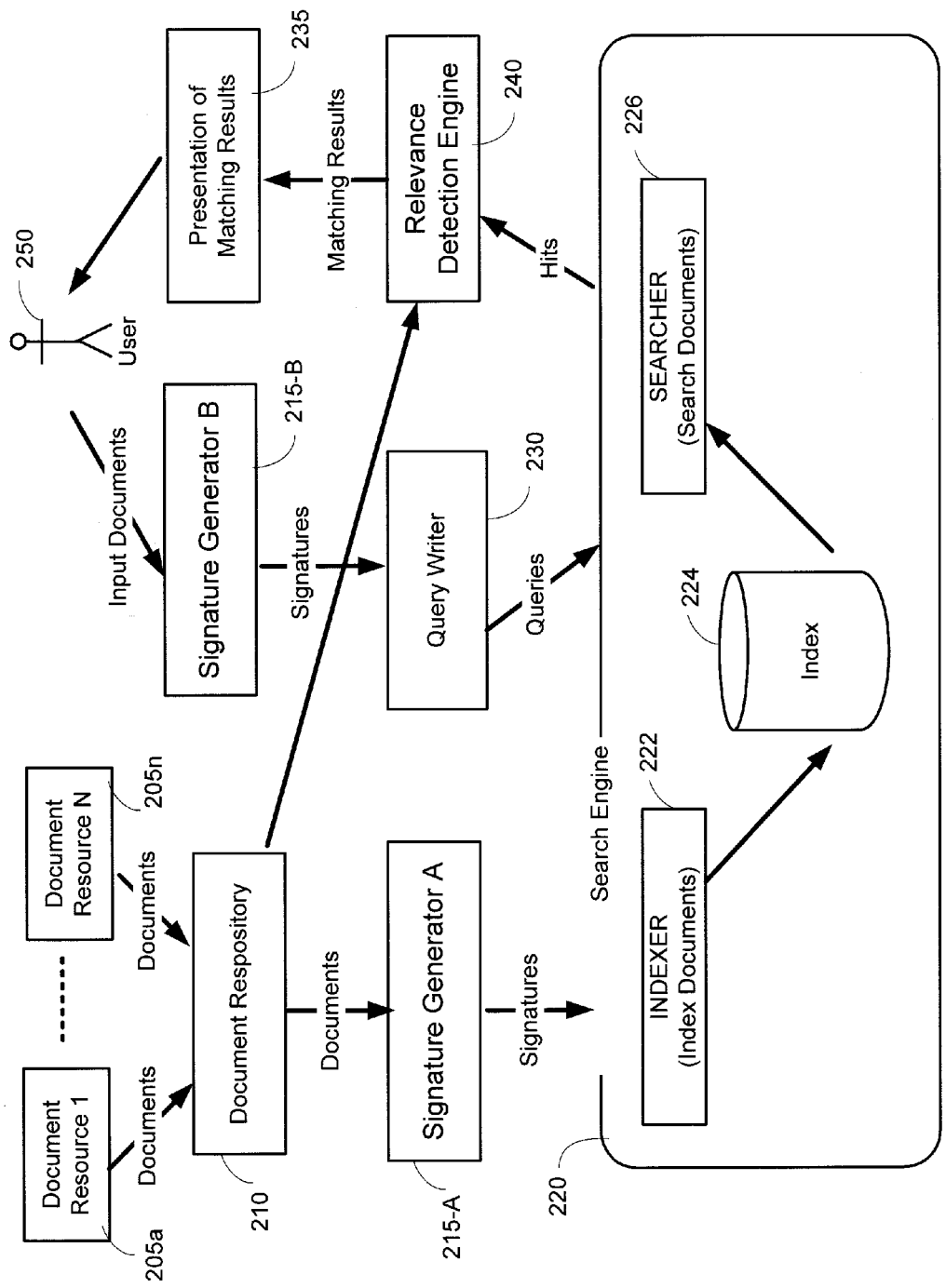
FIG. 2C depicts an embodiment of an architecture of a matching engine with asymmetric signature generation in accordance with an embodiment of the invention.

FIG. 2C depicts an embodiment of an architecture of a matching engine with asymmetric signature generation in accordance with the present invention. As indicated in the diagram, the two signature generators 215-A (for the indexer) and 215-B (for the searcher) are now configured differently.

More particularly, the two signature generators 215-A (for the indexer) and 215-B (for the searcher) may use a same signature generation algorithm or process, but they may be configured differently from each other in that they may use different input parameters for the signature generation process. For example, each of the signature generation processes described in the present application (in relation to FIGS. 3 and 4) may be parameterized as follows. S=ExtractSignature (T, M, N), where ExtractSignature( ) represents the parameterized signature generation process, T stands for the input text, M and N are two inputs that determine the maximum signatures to be extracted, and S represents the output signature set.

Symmetric signature generators have the same inputs (use the same parameters) to generate the signatures for any given text:

| Signature Generator A | S = ExtractSignature(T, M, N) |
| Signature Generator B | S = ExtractSignature(T, M, N) | where M and N are the same.

For example, a particular implementation may set M=5 and N=50 uniformly for all input text T.

In contrast, asymmetric signature generators have different inputs (use different parameters) to generate the signatures for any given text. For example, in one embodiment, the input parameter N may be different for the two signature generators, while the input parameter M may be the same.

In accordance with one embodiment of the present invention, the input parameter N may be determined using N=Get-N-for-GeneratorA (T, L) for Signature Generator A, and using N=Get-N-for-GeneratorB (T, L) for Signature Generator B, where the functions Get-N-for-GeneratorA( ) and Get-N-for-GeneratorB( ) are different, but both calculate the input number N based on a text size T of the input text and a tolerance level L. The tolerance level defines the expectation that the match engine is able to identify variations of any document. The tolerance level may be presented in percentile. For example, a tolerance level of 30% means that match engine is able to identify a version of a document even if the content has been changed up to 30%.

In one specific implementation, the following six tolerance levels are defined.

Level 1: 5%
Level2: 10%
Level 3: 20%
Level 4: 40%
Level 5: 50%
Level 6: Best Effort In addition, this specific implementation defines the two functions Get-N-for-GeneratorA and Get-N-for-GeneratorB according to Table 1 shown below, depending on the tolerance level (Levels 1 through 6) and the text size (in various size ranges).

TABLE 1

| Level | Text Size Range in KB | M | N for generator A | N for generator B |
|---|---|---|---|---|
| 1 | 0-10K | 4 | 2 | 32 |
| 1 | 10-20K | 4 | 4 | 64 |
| 1 | 20-30K | 4 | 4 | 64 |
| 1 | 30-50K | 4 | 4 | 128 |
| 1 | 50-70K | 4 | 8 | 128 |
| 1 | 70-80K | 4 | 8 | 128 |
| 1 | 80-100K | 4 | 8 | 128 |
| 1 | 100-500K | 4 | 16 | 1024 |
| 1 | >500K | 4 | 1024 | 1024 |
| 2 | 0-10K | 4 | 2 | 32 |
| 2 | 10-20K | 4 | 4 | 64 |
| 2 | 20-30K | 4 | 8 | 64 |
| 2 | 30-50K | 4 | 8 | 128 |
| 2 | 50-70K | 4 | 16 | 128 |
| 2 | 70-80K | 4 | 16 | 256 |
| 2 | 80-100K | 4 | 16 | 256 |
| 2 | 100-500K | 4 | 64 | 1024 |
| 2 | >500K | 4 | 1024 | 1024 |
| 3 | 0-10K | 4 | 4 | 32 |
| 3 | 10-20K | 4 | 8 | 64 |
| 3 | 20-30K | 4 | 16 | 64 |
| 3 | 30-50K | 4 | 16 | 128 |

TABLE 1-continued

| Level | Text Size Range in KB | M | N for generator A | N for generator B |
|---|---|---|---|---|
| 3 | 50-70K | 4 | 32 | 256 |
| 3 | 70-80K | 4 | 32 | 256 |
| 3 | 80-100K | 4 | 32 | 1024 |
| 3 | 100-500K | 4 | 128 | 1024 |
| 3 | >500K | 4 | 1024 | 1024 |
| 4 | 0-10K | 4 | 8 | 64 |
| 4 | 10-20K | 4 | 16 | 256 |
| 4 | 20-30K | 4 | 16 | 256 |
| 4 | 30-50K | 4 | 32 | 1024 |
| 4 | 50-70K | 4 | 128 | 1024 |
| 4 | 70-80K | 4 | 128 | 1024 |
| 4 | 80-100K | 4 | 128 | 1024 |
| 4 | 100-500K | 4 | 1024 | 1024 |
| 4 | >500K | 4 | 1024 | 1024 |
| 5 | 0-10K | 4 | 16 | 64 |
| 5 | 10-20K | 4 | 32 | 256 |
| 5 | 20-30K | 4 | 32 | 256 |
| 5 | 30-50K | 4 | 32 | 1024 |
| 5 | 50-70K | 4 | 128 | 1024 |
| 5 | 70-80K | 4 | 128 | 1024 |
| 5 | 80-100K | 4 | 128 | 1024 |
| 5 | 100-500K | 4 | 1024 | 1024 |
| 5 | >500K | 4 | 1024 | 1024 |
| 6 | 0-10K | 4 | 16 | 256 |
| 6 | 10-20K | 4 | 32 | 256 |
| 6 | 20-30K | 4 | 32 | 1024 |
| 6 | 30-50K | 4 | 64 | 1024 |
| 6 | 50-70K | 4 | 128 | 1024 |
| 6 | 70-80K | 4 | 128 | 1024 |
| 6 | 80-100K | 4 | 128 | 1024 |
| 6 | 100-500K | 4 | 1024 | 1024 |
| 6 | >500K | 4 | 1024 | 1024 |

As seen in Table 1, N generally increases with increasing tolerance level and, in this implementation, is assumed to be a number which is a power of 2 (i.e. 2, 4, 8, 16, 32, ...). Given a selected tolerance level, N generally increases with increasing text size. Moreover, given a particular tolerance level and text size, N for generator A is generally smaller than N for generator B.

The above-discussed specific embodiment selects different numbers N in an adaptive manner depending on the text size while applying a same number M. Applicants have determined that this embodiment may be utilized to advantageously reduce a volume of the index (signature) database 224 while maintaining almost the same accuracy and performance of symmetric signature generation.

More generally, applicants have determined the following aspects and features to be advantageous.

Generator A should generate much less number of signatures than generator B.

The numbers of signatures extracted by both Generators A and B should be set accordingly based on the input text size.

Numbers of signatures extracted by both A and B should be set accordingly based on pre-defined tolerance level which is configurable by the system.

Applicants submit the following mathematical theorems in support of the assertion that the asymmetric signature generation may be used so as to reduce the signature database volume while maintaining almost the same accuracy and performance of symmetric signature generation.

For any text T, lets denote S(T, N) as the signature set that is extracted from T by generator given inputs T and N.

Theorem: Let T be any text, and n and m be two numbers with power of 2. If n<m, the following result holds:

$$S(T,n) \subset S(T,m)$$

which means the set S(T,n) is included in S(T,m).

Corollary: Let $T_1$ and $T_2$ be two versions of the same text, and n and m be two numbers with power of 2. If n<m, the following result holds:

$$S(T_1,n) \cap S(T_2,n) \subset S(T_1,n) \cap S(T_2,m) \subset S(T_1,m) \cap S(T_2,m)$$

where $S(T_1, n) \cap S(T_2, m)$ is exactly what the asymmetric signature generation presents the match accuracy. Here n and m can be considered as input numbers for generator A and B respectively.

This corollary states that the match capability of asymmetric signature generation is between the two cases of symmetric signature generation with small signature number and large signature number. As a matter of factor, the experimental data shows it is closer to the second case. However, the signature database is much smaller.

In accordance with one embodiment of the invention, searchers 226 may be configured at various protection points of a network. Placement of the searchers 226 at protection points of a network may be used, for example, to protect against leakage of sensitive data from an institutional network. Protection points of a network may include, for example, internet protocol routers, wireless access points, certain input/output (e.g., data storage or networking) interfaces of host computers (e.g., desktops, laptops), mobile devices and so on.

It is noted that, in one embodiment, the database may be a conventional database, for example, a flat file or relationship database. In addition, various embodiments of the processes disclosed herein may be implemented using one or more software elements. In general, a software element (or modules) may refer to any software structures arranged to perform certain operations. In one embodiment, for example, the software elements may include program instructions and/or data adapted for execution by a hardware element, such as a processor. Program instructions may include an organized list of commands comprising words, values or symbols arranged in a predetermined syntax, that when executed, may cause a processor to perform a corresponding set of operations.

Signature Generation Processes

In general, a signature generator extracts a set of signatures from any relevant document. Each signature may be, for example, an ASCII string with fixed length. There are certain criteria that should be satisfied by such signatures. First, two irrelevant documents should not share the same signature. Second, two versions of the same document should share at least one common signature.

The following two signature generation algorithms or processes are designed to extract signatures from ASCII texts and UTF-8 texts, respectively. These two example processes are described in detail below in relation to FIGS. 3 and 4, respectively.

Figure 3:
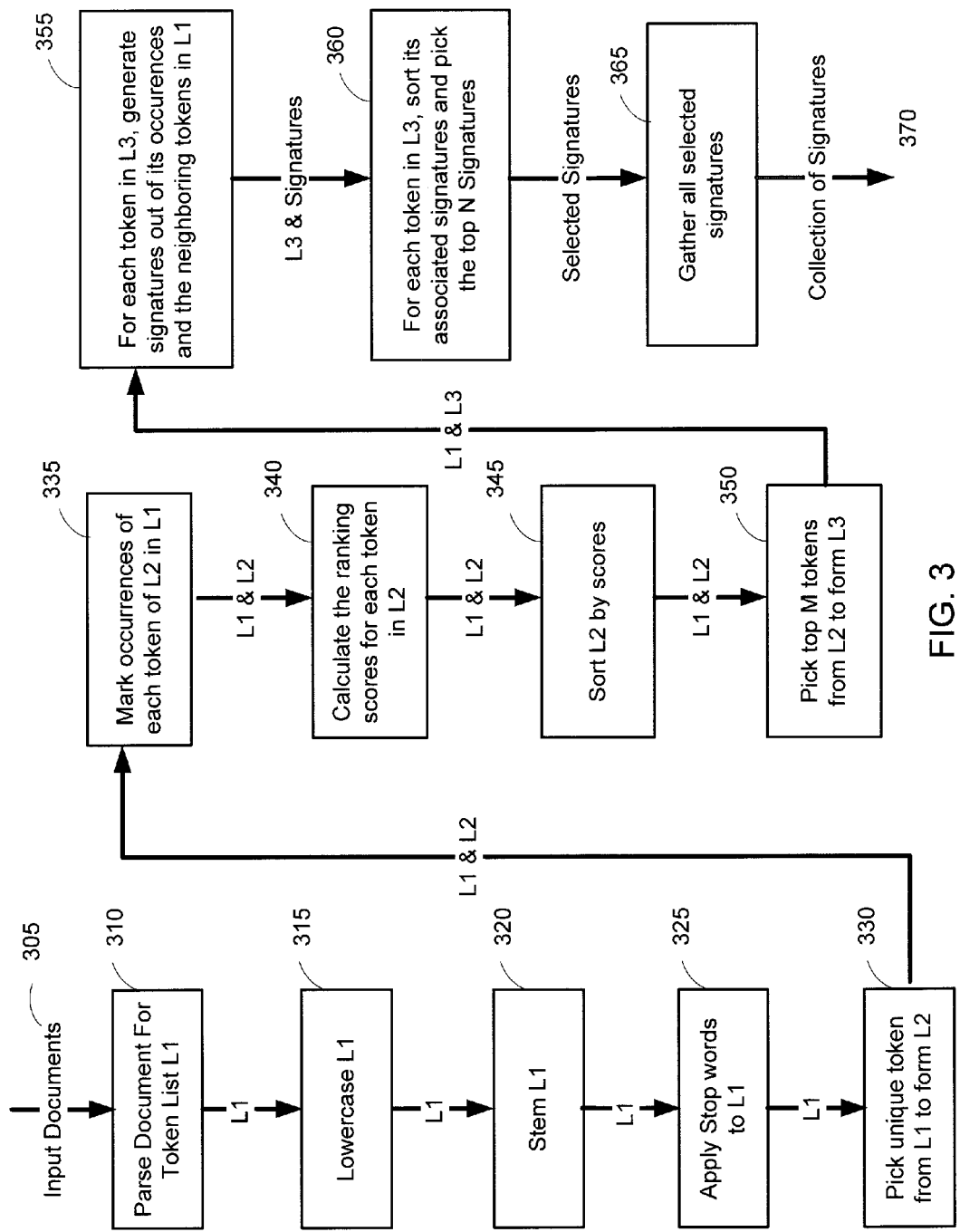
FIG. 3 illustrates a first embodiment of a signature generation process for use with English language documents in accordance with an embodiment of the invention.

FIG. 3 illustrates a first embodiment of a signature generation process in accordance with the present invention. This embodiment illustrates generating signatures from an English document encoded in ASCII codes. Note the following regarding this process. Steps 310, 315, 320, and 325 pre-process tokens from the documents. Steps 330, 335, 340, 345, and 350 select the most informative tokens. Steps 355 and 360 generate the signatures. In particular, step 355 ensures signatures generated are unique to the input document context, and step 360 limits the number of signatures collected while keeping the stability of the collection across varied versions of the same document.

The process begins with inputting 305 the document. The process parses 310 the document to generate (or create) an initial list of one or more tokens (a token list). In one embodiment, a token includes text in the document separated by a predefined character characteristic. Examples of predefined character characteristics include a delimiter. Once tokens are separated, functions such as stemming, stop-word or lower case analysis can be applied.

The process continues with lower casing 315 each token of the token list. Lower casing 315 is a function that converts each letter of a token to a lower case character. The process also stems 320 each token of the token list. It is noted that word stemming is a process to identify or extract core roots from a word. Continuing, the process applies 325 a stop-word-list to each token of the list to formulate a new first token list (L1). The stop words are words that are considered as carrying no information. Examples of stop words include 'the', 'are', 'do', 'am' and the like. In addition, the process stems each member of a stop-word-list.

The process selects (or picks) 330 each unique token of the first new token list ($L_1$) to form a second token list ($L_2$). For each token in the second token list L2, the process marks 335 its positions of occurrences in the first token list L1 to generate sets:

$$L_1 = \{t_1, t_2, \ldots, t_m\}$$

$$L_2 = \{T_1, T_2, \ldots, T_n\},$$

where denote $T_i$~<$P(i,1), P(i,2), \ldots, P(i,S_i)$> to mark the positions of occurrences and where i=1, ..., n and where $S_1 + S_2 + \ldots + S_n = m$.

The process then calculates (or generates) 340 a ranking score of each token in the second token list L2. The scores may be determined by:

$$\text{Score}(T_j) = [P(j, S_j) - P(j,1)] * S_j * \text{Weight}(T_j) / \text{Sqrt}(D_j),$$

$$\text{where } D_j = [P(j,2) - P(j,1)]^2 + [P(j,3) - P(j,2)]^2 \ldots + [P(j, S_j) - P(j, S_{j-1})]^2$$

In addition, a score function measures the importance of a token in the text by the frequency and also its assigned weight. It is noted that weight( ) may be a pre-defined function. In one embodiment, its value is a '1', although in alternative embodiments its value may be some pre-assigned number, e.g., 6.8, if the token contains some special characters like '-', '_' and '@'. The score function may be determined by $S_j * \text{Weight}(T_j)$. The score function may be used to evenly distribute tokens over the document to get better scores. This is determined by $[P(j, S_j) - P(j,1)] / \text{Sqrt}(D_j)$.

Next, the process sorts 345 the second token list $L_2$ by the calculated scores and then selects (or picks) 350 the top M tokens by score from that list ($L_2$). It is noted that M can be any integer and may be predefined within the system or may be selected as an input into the system. The top M tokens by score from the second token list $L_2$ creates a third token list $L_3$. For each token $T_j$ of the third token list $L_3$, generate 355 signatures out of its occurrences and the neighboring tokens in $L_1$. This process also can be represented as:

For each k∈$\{P(j,1), P(j,2), \ldots, P(j,S_i)\}$, pick its neighboring 2d tokens in L1 and concatenate them together to form a string, that's $t_{k+d} + \ldots + t_{k-1} + t_k + t_{k+1} + \ldots + t_{k+d}$.

Encoding this string gives us a signature $F_{j,k}$.

For each $T_j$ in the third token list $L_3$, the process sorts the list $\{F_{j,1}, F_{j,2}, \ldots F_{j,Sj}\}$ and selects 360 the top N signatures from this sorted list. It is noted that N can be any integer and may be predefined within the system or may be selected as an input into the system. Next, for all members of the third token list $L_3$, there is a total of (M*N) selected signatures are gathered (or collected) 365. The process then outputs 370 the collection of signatures.

Figure 4:
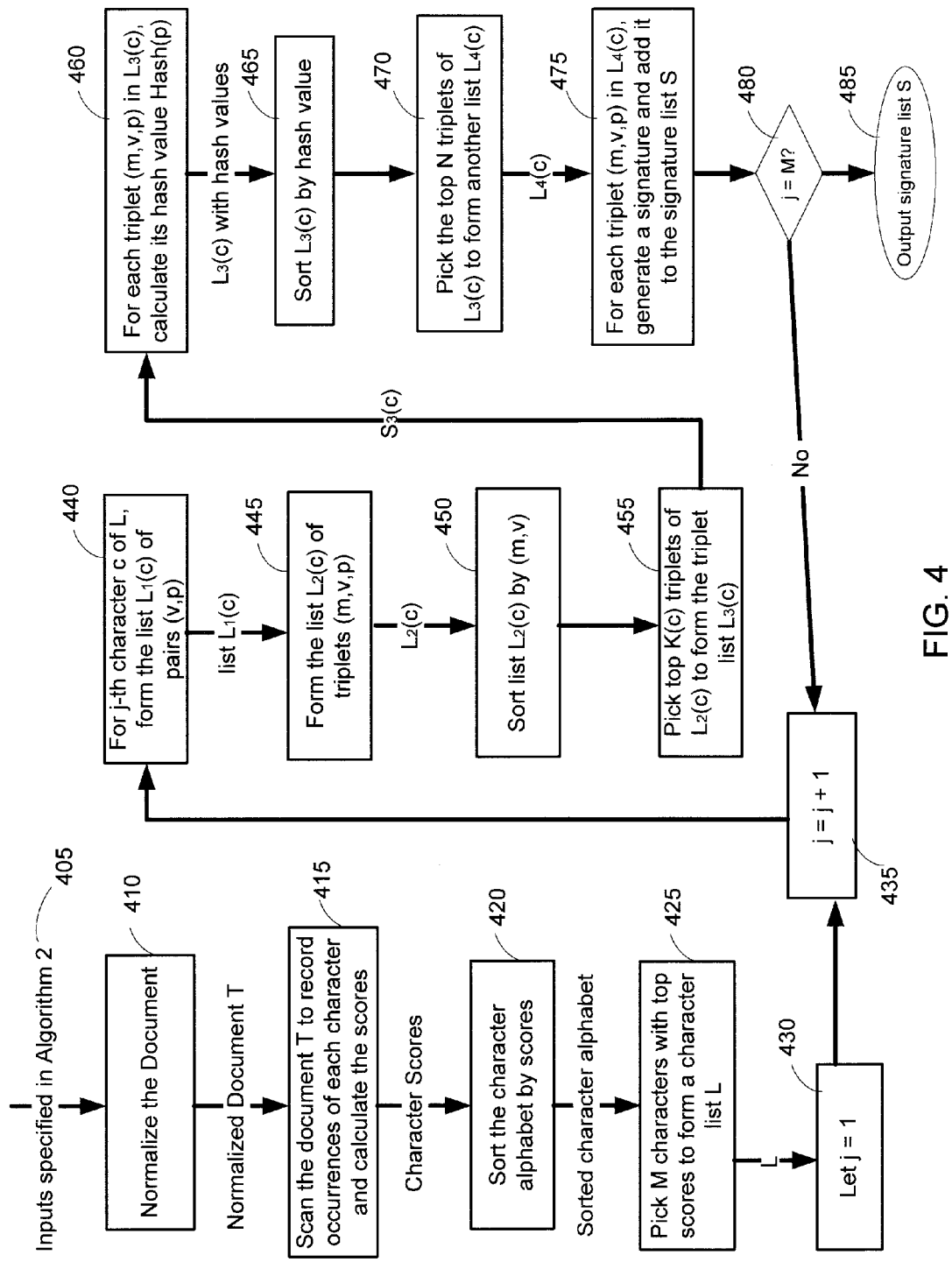
FIG. 4 illustrates a second embodiment of a signature generation process for use with universal transformation format encoded documents in accordance with an embodiment of the invention.

FIG. 4 illustrates a second embodiment of a signature generation process in accordance with the present invention.

The second embodiment includes a process that inputs 405, for example, a textual document of any language in plain UTF-8 format (universal transformation format) and a list of characters in UTF-8 alphabet that we consider as being informative. In addition, other inputs may include some number M, which corresponds to a number of characters with top ranking scores, and some number N, which corresponds to a maximum signature number for each character. Other optional inputs may include a constant integer CHAR_NEIGHBOR, which can have a predefined value, for example, 30. This constant integer defines a size of a character's neighbor in a text string, which will be used to generate signatures. Another input is a selection rate R. It has a predefined range between 0 and 1, for example, 0.20. The selection rate is a number for use of selecting a subset out of a set. Yet another input may be an empty signature list S.

The process normalizes 410 the document by scanning the document to remove the characters that are not informative. A non-informative character is a UTF-8 character that does not contribute to the text context. They may provide other purposes such as formatting. For example, if a string has n consecutive spaces, then n-1 spaces are considered non-informative. Other examples of non-informative characters include control (CTRL) characters and returns.

The process then scans 415 the normalized document to record the occurrences of each character, c, in the UTF-8 alphabet. The position of the occurrences is denoted as P(1,c), P(2,c), ..., P(n,c). The process calculates (or generates) the ranking score for the character c using:

$$\text{Score}(c) = \text{Sqrt}(n) * [P(n,c) - P(1,c)] / \text{Sqrt}(D)$$

where $D = [(P(2,c) - P(1,c)]^2 + [(P(3,c) - P(2,c)]^2 + \ldots + [(P(n,c) - P(n-1,c)]^2$. The score function measures an importance of a character in the text by its frequency. The score function also ensures that the characters that are evenly distributed over the document get better scores. A calculation for achieving this includes:

$$[P(n,c) - P(1,c)] / \text{Sqrt}(D).$$

The process continues with sorting 420 the character alphabet by score and then selects (or picks) 425 the M characters with top scores. This generated list may be denoted as character list L. It is noted that M can be any integer and may be predefined within the system or may be selected as an input into the system as previously described.

For each character c in the character list L, at each occurrence p of character c, the process calculates its neighbor. In particular, the process values by taking its left and right character and concatenating all the encoding bytes together to form an integer v. This neighbor-value v and the occurrence p make a pair (v, p). Next, the process assigns 430 a value of 1 to a variable j. Variable j is an enumeration of the list L. By using j, members of L may be processed one by one. In the illustrated process, this structure is used to realize a concept of "each" and is incrementally increased 435. In turn, this forms 440 a list $L_i(c)$ of pairs for each character c in the character list L. The size of the list $L_1(c)$ may be denoted as N(c). For each list $L_1(c)$, the process counts the repeats m of each neighbor-value v in the list to form 445 a second list $L_2(c)$ with triplets (m, v, p). The size of the second list $L_2(c)$ also may be denoted as N(c). Each list $L_2(c)$ is sorted 450 by (m, v), where m is the first comparison parameter and v is the second comparison parameter.

The process selects (or picks) 455 the top K(c) triplets from the second sorted list $L_2(c)$, where $K(c) \leq R * N(c)$. This forms a third list $L_3(c)$. For each triplet (m, v, p) of the third list $L_3(c)$, the process calculates 460 its hash value by a hash function, hash(p), which generates hash value with the neighboring characters surrounding the occurrence position p. An example of an applicable hash function may be the conventional Karp-Rabin hash function. The number of neighboring characters is determined by CHAR_NEIGHBOR. The process sorts 465 the third list $L_3(c)$ by hash value and selects (picks) 470 up to N triplets from the top of sorted list $L_3(c)$ to form a fourth list $L_4(c)$. It is noted that N can be any integer and may be predefined within the system or may be selected as an input into the system as previously noted. For each triplet (m, v, p) in $L_4(c)$, the process generates 475 a signature using the characters surrounding the occurrence position p and add it into signature list S. It is noted that process described is iterative, and therefore, is iterated for all characters c in list L. In other words, the variable j (indicating the j-th character c of L) is incremented 435 until j=M 480, where M is the number of characters with top scores. At the end of the process, a signature list S is output 485.

The signature generator is a unique configuration that beneficially replaces the roles of keywords when composing queries. The signature generator is efficient because it reduces the size of hits. This increases the performance of the matching engine. Moreover, the signature generator improves the search precision rate of the matching engine. Further the signature generator can be structured to be language-independent, thus expanding the scope of documents available for search.

Overall, signatures play a particular role in a search engine in a manner that may be more useful than conventional keywords. Signatures are abstracted from documents in a manner as described herein to characterize/represent documents better than keywords. Hence, they are more relevant to the documents than keywords. Note that signatures may be different than keywords in that a signature is strongly relevant to a document while a keyword is not necessarily so, two irrelevant documents do not share any signature while they could own the same single keyword, and signatures achieve better search precision rates than keywords.

A system in accordance with the present invention also may include opportunities for relevance detection. With respect to relevance detection, each document can be considered as a string of characters (ASCII, Unicode, etc.) of an alphabet. Thus, the relevance of two documents is strongly related to the similarity of two strings. There are conventional approaches to define the similarity of two strings. One approach is to get the largest common subsequence of two strings. A second approach is to extract the largest common substring of two strings. However, both of these approaches do have limitations that often make their use inadequate. The largest common string approach does not include other smaller common substrings, and therefore, is not accurate. The largest common subsequence approach cannot deal with content swapping, and therefore, is also inaccurate.

A third approach, in accordance with the present invention, starts with string similarity. For example, consider two strings str1 and str2, and a list S of substrings of the $2^{nd}$ string str2. This list satisfies conditions that all members in S do not overlap, the length of each member in S should be greater than a minimum value M, and each member of S is also a substring of str1. It is noted that M can be any integer and may be predefined within the system or may be selected as an input into the system.

For all sets of substrings satisfying the noted three conditions, S gets maximal sum of all substring lengths. A function SIM is applied to measure the similarity of str2 to str1. The function may be defined by:

SIM(str2,str1)=(sum of lengths of all substrings in S)/(length of str2)*100%

It is advised that the function SIM is not symmetric, i.e., SIM(str1,str2)≠SIM(str2,str1). For example, consider str1="AAAAACCCCCCCCBBBBBBDDDDDDAAAAAA LLLLLLL" and str2="CCCCCCCCCZZZZZAAAAAAABBBBTTTTLLL". The required minimum of substring length may be set, for example, as M=4. Then S={"AAAAAA","CCCCCCCC", "BBBB"} the substrings of str2 is what is needed to calculate a similarity:

SIM(str2,str1)=18/27=67%.

The example above illustrates one embodiment of similarity of two strings that is actually defined by substring copies from str1 to str2 with a minimum size requirement of each copy. In text documents, there are many characters that are not necessarily contributing to the document context. For example, extra space and invisible characters are not informative at all. Hence, these useless characters are first removed from the documents before applying the function SIM. This process may be referenced as string normalization. For example, the string "There are some useless characters in this sentence !" can be normalized as "There are some useless characters in this sentence!". In this example, there are unneeded (or useless) spaces between words in the original sentence and only one space between words after normalization.

In addition to the above, consider the following example given two text documents doc1 and doc2 in plain ASCII or UTF-8 format. Initially, documents doc1 is normalized to become string str1 and document doc2 is normalized to become string str2. The relevance of doc2 to doc1 is defined by SIM (str2, str1), which can be denoted as RLVN(doc2, doc 1). The function RLVN is not symmetric in this example.

Next, string suffixes are considered. Given a string $X=x_0 x_1 \ldots x_n$ of n+1 characters, where the first n characters comprise the actual string and $x_n=\$$ is a unique sentinel character not defined in the ASCII or UTF-8 table, a suffix of X starting in the position i where i=0, 1, . . . , n, is denoted as S(X,i). In this example, S(X,0)=X and S(X,n)=$ and the string X has n+1 suffixes (or suffix strings). In addition, the suffix strings are sorted. String X has n+1 suffix strings. These can be sorted lexicographically by any means. Suffix sorting is a conventional algorithm problem known to those skilled in the art.

Relevance Detection Processes

Figure 5:
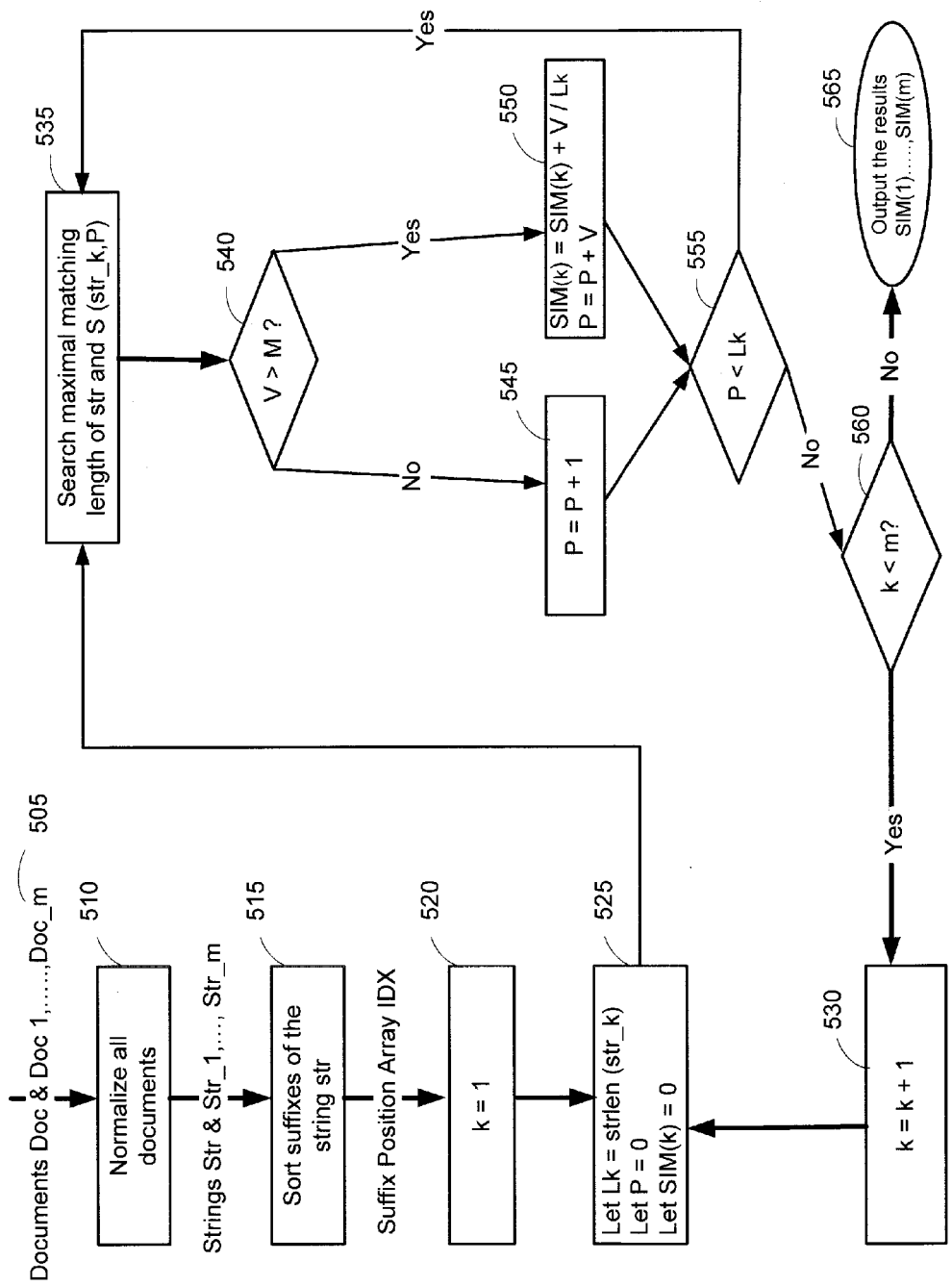
FIG. 5 illustrates a first embodiment of a relevance detection process in accordance with an embodiment of the invention.

With the above overview in mind, reference is now made to FIG. 5. FIG. 5 illustrates a first embodiment of a relevance detection process in accordance with the present invention. The process starts with input 505 of an initial document (e.g., referenced as doc) plus one or more additional documents, plus an integer M. By way of example, there the list of additional documents may be a list of text documents to be matched. The additional documents may be referenced as $doc_1$ (or doc__1) through $doc_m$ (or doc_m), where m is the number of additional documents and M is an integer corresponding to a minimum substring match length. It is noted that M can be any integer and may be predefined within the system or may be selected as an input into the system as previously described.

The process normalizes 510 all the documents, initial doc plus additional $doc_s$, through $doc_n$, to get strings str, $str_1$ (or str_1) through $str_m$ (or str_m). Through use of a conventional suffix sorting algorithm, the process sorts 515 the suffixes of str with an array IDX to record the suffix string positions. It is noted that array IDX is known in conventional suffix sorting algorithms. The process then assigns (or lets) 520 a variable, k, to be assigned a value, for example, assigning k=1. It also assigns (lets) 525 variable L be a length of string str, variable $L_k$ be the length of $str_k$, variable P=0, and $SIM_k$=0.

The process next searches 535 a maximum matching length of string str and $S(str_k, P)$. In particular, the process assigns (lets) variable V=searchMaxMatchLen (IDX, 0, L, str, L, $S(str_k,P)$, $L_k$–P), where searchMaxMatchLen ( ) is a recursive function to calculate the maximal matching length of string str and $S(str_k, P)$ as defined further:

```
int searchMaxMatchLen (int IDX, int start, int end, char
    *str, int len, char *str2, int len2){
int i, j;
if(end-start<2) {
i=getMaxMatchSize(str+IDX[start], len –IDX[start], str2,
    len2);
j=getMaxMatchSize(str+IDX[end], len –IDX[end], str2,
    len2);
if(i>j)
    return i;
else
    return j;}
i=start+(end-start)/2;
if(strncmp(str+IDX[i], str2, minimum(len–IDX[i], len2))
    <0)
    return searchMaxMatchLen (IDX, i, end, str, len, str2,
        len2);
else
return searchMaxMatchLen (IDX, i, start, str, len, str2,
    len2);}
int getMaxMatchSize(char *str, int len, char *str2, int
    len2){
int i;
for(i=0; (i<len) && (i<len2); i++)
if(str[i] !=str2[i]) break;
return i;}
```

The above illustrates an example of a function searchMaxMatchLen to search the suffix string (of string str) which shares the longest common prefix substring with another string str2. This function is implemented by a binary search. The function getMaxMatchSize is to get the longest common prefix among two strings. Next, the process determines 540 V>=M, then it assigns 550 $SIM_k=SIM_k+V/L_k$, P=P+V. Otherwise, if the process determines 540 that condition V>=M is not met, the process increments 545 variable P so that P=P+1. If the process then determines 555 that P<$L_k$, the process goes back to searching 535 a maximum matching length of string str and $S(str_k, P)$.

If the process determines 555 that the condition P<$L_k$ is not met, the process then determines 560 if k<m. If k<m, the process increments 530 k by k=k+1 and process goes back to assign 525 variable L be a length of string str, variable $L_k$ be the length of $str_k$, variable P=0, and $SIM_k$=0. If the process determines 560 that condition k<m is not met, the process outputs 565 the results of $SIM_1, \ldots, SIM_m$.

The output advantageously presents a similarity in percentages between an input document and a list of additional documents. For example, as illustrated above there is given a threshold percentage x % and an input document to find the documents in the stored index document database. The process beneficially generates the signatures of the input document by signature generator. The searcher searches the index database using the signatures and returns a list of documents (hits), each of which shares at least one common signature with the input documents. The relevance detection process calculates the similarity between the input document and each document in the list. These are output as $SIM_1, \ldots, SIM_m$. The process can now select documents that satisfy $SIM_k$>=x %. This logic also is implied through the matching engine architecture.

Figure 6:
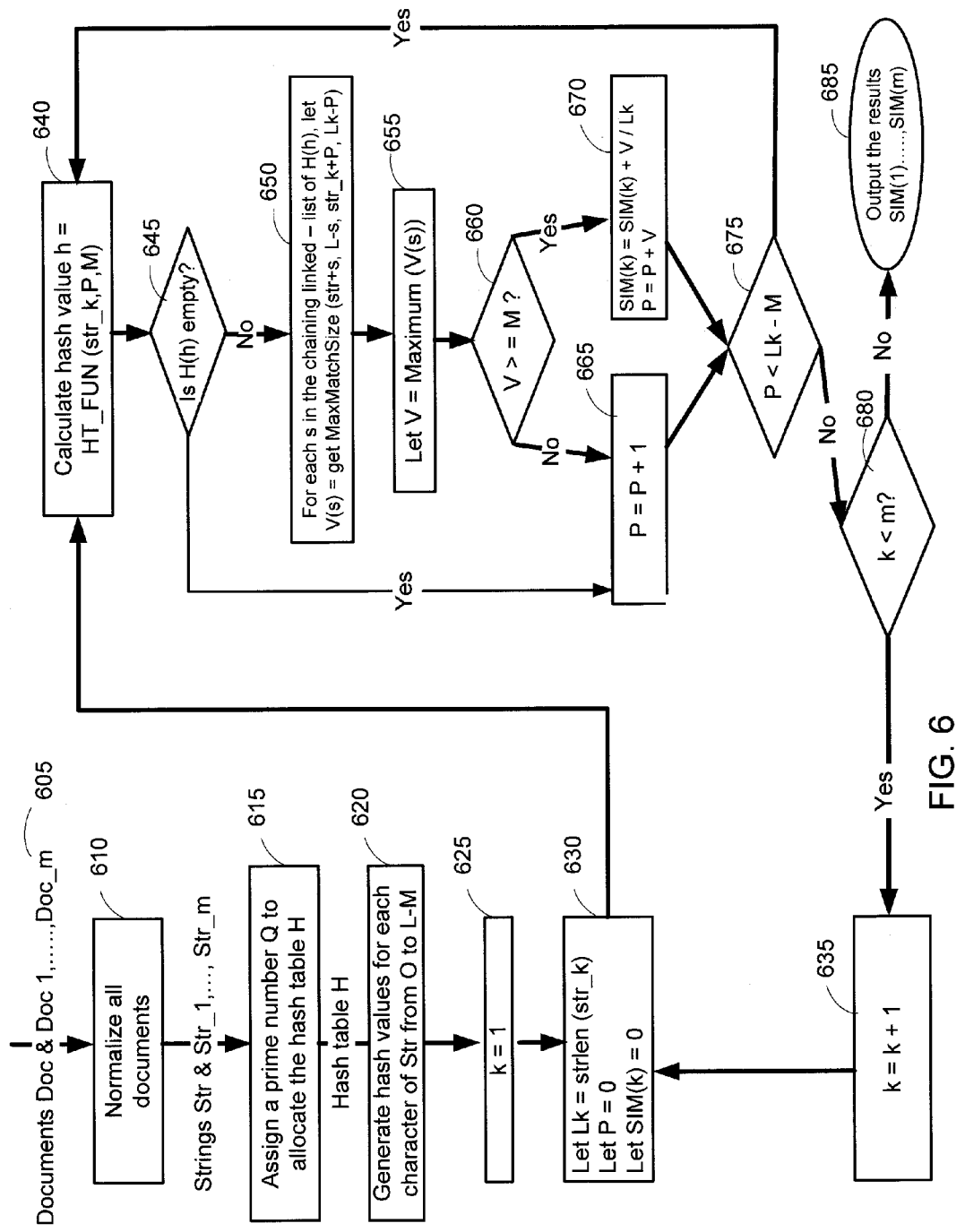
FIG. 6 illustrates a second embodiment of a relevance detection process in accordance with an embodiment of the invention.

Referring now to FIG. 6, it illustrates a second embodiment of a relevance detection process in accordance with the present invention. The process begins with an input 605 of an initial text document, referenced as doc, and a list of text documents to be matched to the doc, plus an integer M. The list of text documents is referenced as $doc_1, \ldots, doc_m$. where m is the number of text documents and M is a minimum substring match length. It is noted that M can be any integer and may be predefined within the system or may be selected as an input into the system as previously described.

The process normalizes 610 doc, $doc_1, \ldots, doc_m$ to generate (or produce) strings str, $str_1, \ldots, str_m$. Next, the process assigns 615 a prime number, Q, which is larger than the size of string str and is referenced as L. By way of example, assume for purposes of describing this embodiment that Q=3*L/2. The process allocates an array H with size Q for a hash table with chaining capability to resolve collisions of hash values. For a given variable, j=0 to L–M, the process generates 620 a hash value, h=HT_FUN(str , j, M), and stores the string position, j, in H[h]. Alternatively, it may store it in collision chaining linked-list. The hash function HT_FUN is to calculate a hash value of a substring of the string str, which starts at position j and with a length M. In one example embodiment, a conventional Karp-Rabin hash function may be applied.

Next, a variable k is assigned 625 a value, for example, k=1. Further, values also are assigned 630 for $L_k$ to be the length of string $str_k$, P=0, and $SIM_k$=0. The process calculates 640 a hash value so that h=HT_FUN($str_k$, P, M). The process looks up a hash table entry H[h] and determines 645 if H[h] is empty. If H[h] is not empty, then for each string position s of the chaining linked-list at H[h], the process assigns 650 a variable V(s)=getMaxMatchSize(str+s,L–s, $str_k$+P, $L_k$–P) to get the maximal matching length of two sub-strings. The process then assigns 655 V=maximum(V(s)). Variable V represents the length of the largest prefix string of $S(str_k,P)$ and this prefix is also a substring of string str.

If the process determines 660 that V>=M, it assigns 670 $SIM_k=SIM_k+V/L_k$, and P=P+V. If it determines 660 that V<M, it assigns 665 P=P+1. Likewise, if the process had determined that H[h] is empty, it would assign 665 P=P+1. In either of these latter aspects of the process, the next step is to determine 675 if P<$L_k$–M. If P<$L_k$–M, the process goes back to calculating 640 a hash value so that h=HT_FUN($str_k$, P, M). However, if the process determines that P is not less than $L_k$–M, it then determines 680 whether k<m. If k<m, the process increments 635 k so that k=k+1 and assigns values 630 for $L_k$ to be the length of string $str_k$, P=0, and $SIM_k$=0. If k is not less than m, the process outputs 685 $SIM_1, \ldots, SIM_m$. As noted above, the output advantageously presents a similarity in percentages between an input document and a list of additional documents.

The relevance detection engine beneficially is configured to determine document relevance in percentage measurements. The configuration is structured so that irrelevant documents included in hits can be filtered out by a percentage threshold. This increases search engine utilization and provides results having a greater degree of acceptance.

In one embodiment, the relevance detection engine is beneficially structured to provide a document filter. It calculates a relevance (or similarity) between a given document and a list of other documents based on the definition of document relevance. The relevance is given in percentages. For a given threshold X %, the engine filters out the documents in the list that have relevance less than X %.

Advantageous Signature Index System

The present application discloses an advantageous logical structure for a signature index that includes search tables. An exemplary system for creating, managing and using the signature index are discussed herein. The system consists of index engine and search engine.

Due to their advantageous linear structure, the search tables are compact in disk usage and suitable for diff computation, making large scale deployment feasible. With the introduction of meta-data and an algorithm of multiple value binary search, the search engine based on the search tables is extremely efficient in searching signatures from large search tables storing millions of signatures.

The following provides details for an example document signature search. These details are provided for purposes of a concrete example for discussion and are not meant to be limiting.

- A signature is a string of 8 ASCII characters with ASCII values ranging from 33 to 123 inclusively. That is, each character in a signature can assume one of 91 values.
- Each document may have multiple signatures.
- A unique ID is assigned to each document. This unique ID is called the document ID or file ID. The two terms document ID and file ID are used alternatively herein.
- For a given collection of documents, one has a set of pairs <id, s>, where id and s are a document ID and a signature respectively. And each unique id may be relevant to multiple signatures.
- Our example search problem is defined as follows:
  - All the pairs <id,s> are indexed into well-defined data structures.
    - These data structures are referred to as the signature index.
  - For any given sequence of signatures $S=\{s_1, s_2, \ldots, s_{on}\}$ that may be in ascending order, we may retrieve all document IDs, which may be paired with any signature in S, against the signature index. This is called a strong search.
  - For any given sequence of signatures $S=\{s_1, s_2, \ldots, s_n\}$ that may be in ascending order, we may search whether the signature index contains any of the signatures in S. This is called a weak search.
- Two separate system entities are provided to support the signature search problem.
  - An Indexer (index engine) which builds signature index files from the file IDs and the signatures.
  - A Searcher (search engine) which executes both strong searches and weak searches.

For this particular example, one may calculate that the number of possible signatures is $91^8$, which is 4,702,525,276, 151,521, close to 4,702 trillion. In another words, the size of the signature space is 4,702,525,276,151,521. This is a huge space which is sufficient to accommodate signatures of billions of files. Assume that there are one billion files and each file has at most 128 signatures. With those assumptions, there would be at most 128 billions of signatures which is quite a small number in comparison with the 4,700 trillion size signature space.

It is a challenging task to search signatures from a huge signature file. To enable an efficient signature search, we disclose the following exemplary technique for building and structuring signature files.

- Divide the whole signature space into 8,281 sub-spaces. Each sub-space is defined by the first two bytes of signatures. Hence, the size of each sub-space is $91^6=60,414,540,641$, which is around 60 billion signatures.
- A signature block consists of signatures in the same sub-space. The signatures in a block have the same values in the first 2 characters. There are $91^2=8,281$ signature blocks, corresponding to 8,281 sub-spaces.

To search for a signature, the search engine first determines to which sub-space the signature belongs, then the search engine directly searches through signatures of the corresponding block in the search table. The signatures of each block are sorted in the ascending order in search table. A binary search may then be applied, which is a very fast procedure. In particular, since we are searching a sequence of signatures in ascending order, a multiple value binary search (MVBS) may be utilized for rapid searching performance. A particularly efficient MVBS is disclosed below.

Figure 7:
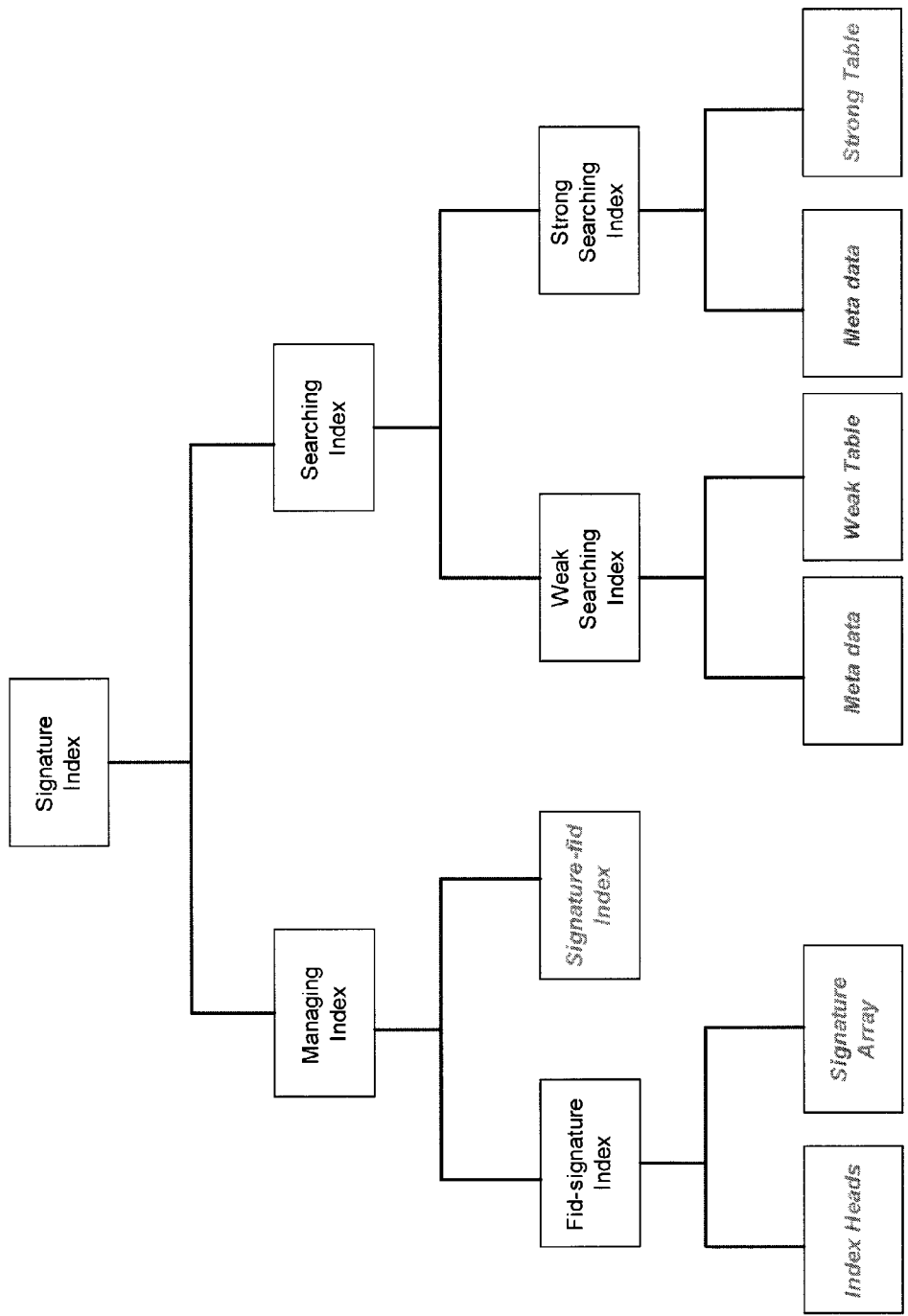
FIG. 7 shows components of a signature index in accordance with an embodiment of the invention.

FIG. 7 shows components of a signature index in accordance with an embodiment of the invention. As shown, the signature index has a hierarchical structure and comprises a managing index and a searching index.

The managing index has two parts, the fid-signature index and the signature-fid index. The fid-signature index is used to add signatures into index. The signature-fid index is generated from the fid-signature index, and the signature-fid index is used to generate the searching index.

The fid-signature index includes index headers (index heads) and a signature array. The index headers may be stored in an index header file, and the signature array may be stored in a signature file.

The index headers are shown in FIG. 8. Signatures belonging to the same fid are stored consecutively together in the signature array. As such, the index headers indicate, for each fid (file identifier or file ID), the number of signatures belonging to a fid (# sig), the position (st_pos) of the first signature for this fid in the signature array, and the position (en_pos) of the last signature for this fid in the signature array. The index headers are arranged in ascending order based on the fid value. When a new fid is added, its entry must be inserted in the appropriate position to keep the order. The index header array may be in memory during the process of record creation. It may be saved in an index header file.

Figure 9:
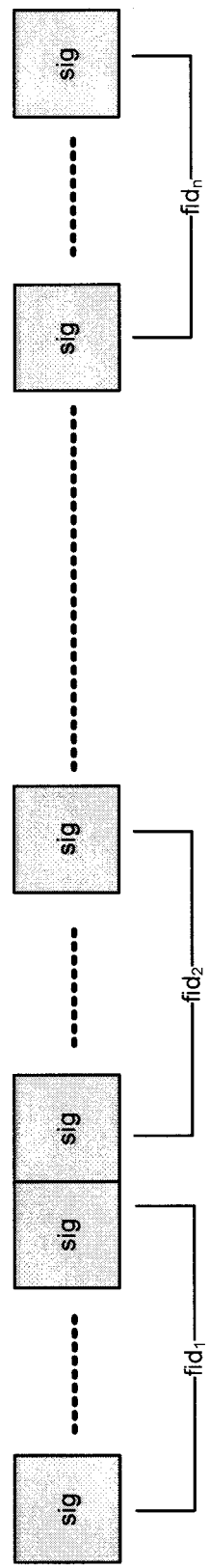
FIG. 9 shows an array of signatures grouped by file ID (fid) in accordance with an embodiment of the invention.

The signature array comprises an array of signatures grouped by fid as shown in FIG. 9. Before the signature array is saved as a signature file, the signatures may be sorted in ascending order of fid such that the signatures in the signature file are stored in ascending order of fid (i.e. in ascending order by the value of the fid). However, the signatures in the array may be grouped by fid, but not necessarily in ascending order of fid when the array is in memory. Thus, when a new record (with its fid and associated signatures) is added to the signature index, its signatures may be appended at the end of the signature array.

Figure 10:
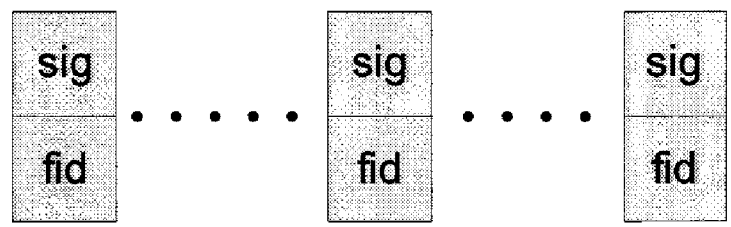
FIG. 10 shows an array of pairs <sig, fid> in ascending order in accordance with an embodiment of the invention.

The structure of the signature-fid index is depicted in FIG. 10. As seen in FIG. 10, the signature-fid index comprises an array of pairs <sig, fid>. In accordance with an embodiment of the invention, these signature-fid pairs are ordered according to the signatures in ascending order. The signature-fid index may be saved in a file called the signature-fid file.

Figure 11:
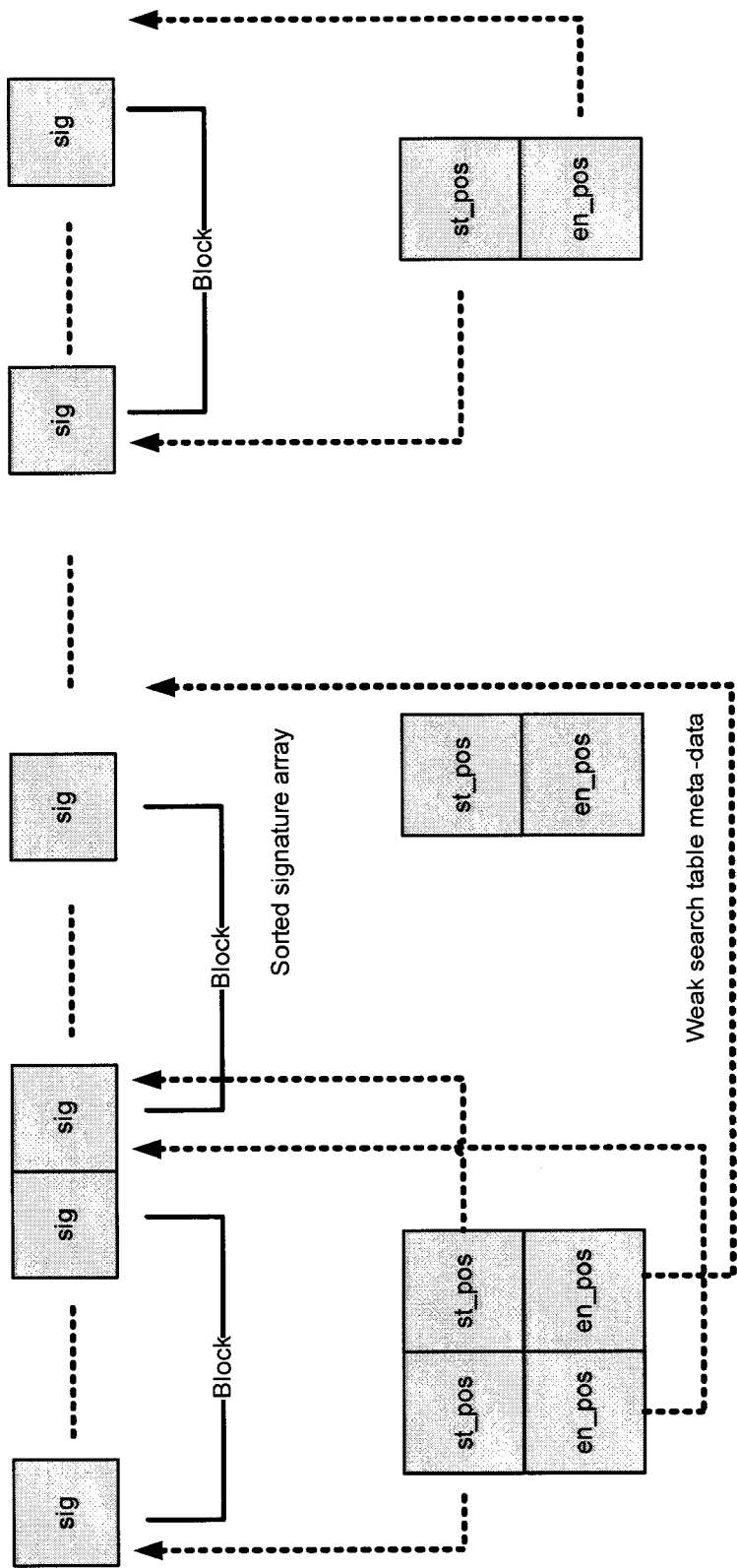
FIG. 11 provides a logical presentation of a weak search index in accordance with an embodiment of the invention.

Returning to FIG. 7, it shows that, in accordance with an embodiment of the invention, the searching index comprises a weak searching index and a strong searching index. FIG. 11 provides a logical presentation of a weak searching index in accordance with an embodiment of the invention, and FIG. 12 provides a logical presentation of a strong searching index in accordance with an embodiment of the invention.

As seen in FIG. 11, the weak searching index includes a meta data array and a weak search table. The weak search table includes signatures that are stored in ascending order based on the signatures themselves. The ordered signatures are organized in blocks. As further shown in FIG. 11, the weak search table meta data may comprise start (st_pos) and end (en_pos) positions for each block. As mentioned above, in accordance with an embodiment of the invention, each signature may be a string of 8 ASCII characters, for example, and the signatures in the same block may have the same first two characters. In this specific embodiment, the meta-data array would have 8,281 elements with each element corresponding to a block of signatures grouped by their first two bytes (for example). If a block has no signature shown in the array, the starting and ending positions may be both zero. The weak search table is preferably implemented such that it does not contain duplicate signatures.

Figure 12:
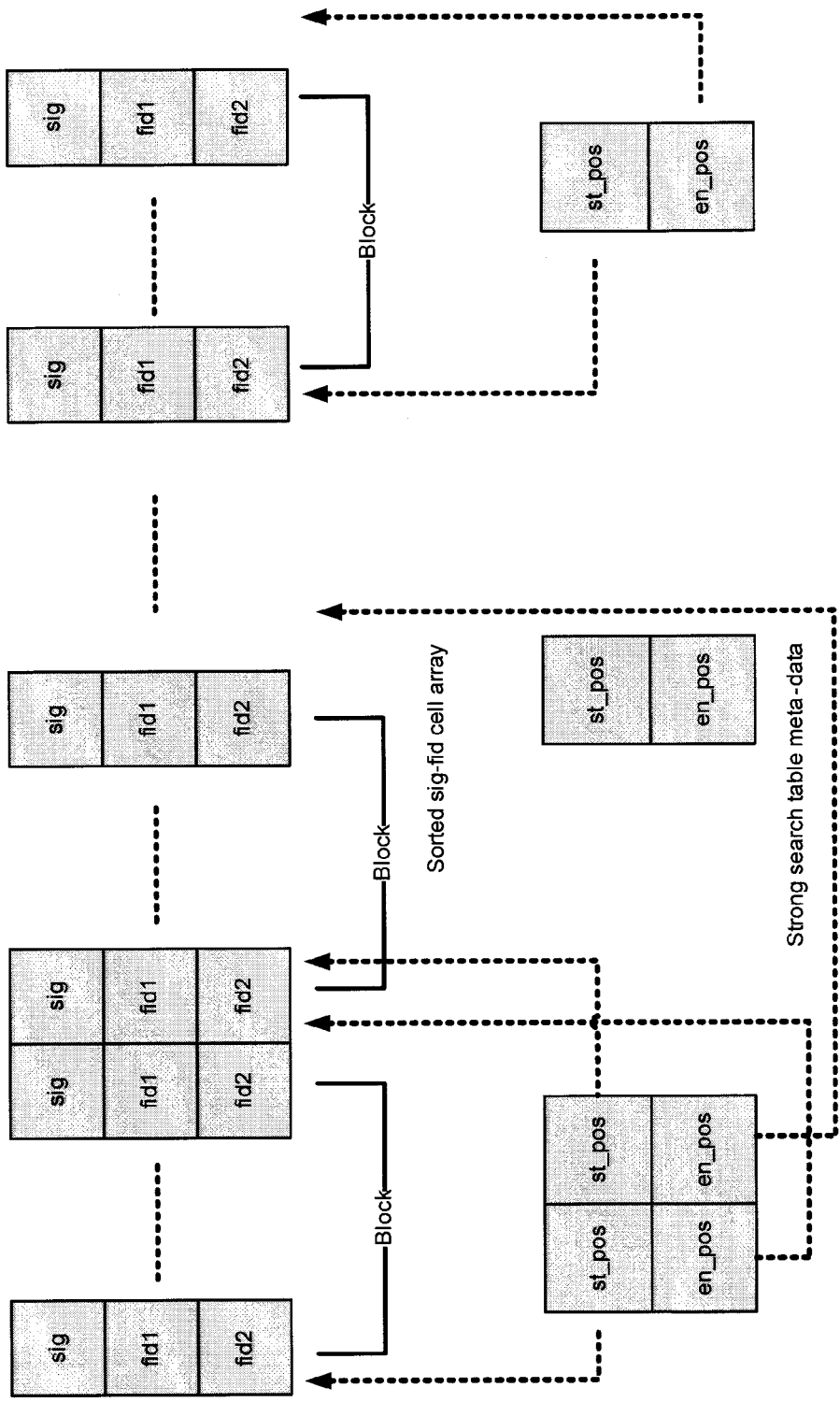
FIG. 12 provides a logical presentation of a strong search index in accordance with an embodiment of the invention.

As seen in FIG. 12, the strong searching index also includes meta data and a strong search table. The strong searching table comprises a sorted sig-fid cell array. In other words, each entry in the strong search table includes a signature and associated fids. Similar to the weak search table, the entries are stored in ascending order based on the signatures themselves, and the ordered signatures are organized in blocks. The associated fids are the identifiers for the files (documents) that contain the signature for that entry. As shown in FIG. 12, the strong search table meta-data may comprise start (st_pos) and end (en_pos) positions for each block of cells. As shown in FIG. 12, the strong searching index has two parts—one part is an array of elements called sig-fid elements may be called the strong search table and the other part is a meta-data array with each element corresponding to a block of signatures grouped by the first two bytes (for example). A sig-fid element has three fields <signature, fid1, fid2>. If a signature belongs to only one fid in index, the fid2 of its associated element has a null value. If a signature belongs to more than two fid, it has more than one associated element. The sig-fid array may be sorted in the ascending order of signatures, and it may contain duplicated signatures. The meta-data array may be defined in the same way as with the case of the weak searching index. The strong search table is used in strong search of signatures.

In summary, the signature index shown in FIG. 7 may be stored in seven files. Two of the files are the index header file and the signature file for the fid-signature index. A third file is the signature-fid file for the signature-fid index. Fourth and fifth files are the weak meta data file and the weak search file (weak search table) for the weak searching index. The sixth and seventh files are the strong meta data file and the strong search file (strong search table) for the strong searching index.

The weak and strong search files are pushed (transmitted and stored) from the server where the index engine (indexer) is hosted to client computers where the search engine (searcher) resides. To optimize the efficiency in updating the search files and to reduce network bandwidth, the difference between different versions of these two search tables may be calculated. However, the difference for the meta-data files may not need to be calculated. Instead, the meta-data files may be compressed and pushed to client computers directly.

Also, either weak search files or strong search files, but not both, may be pushed to a particular client computer. Whether a weak or strong search file is pushed to a particular client is configurable.

Figure 13:
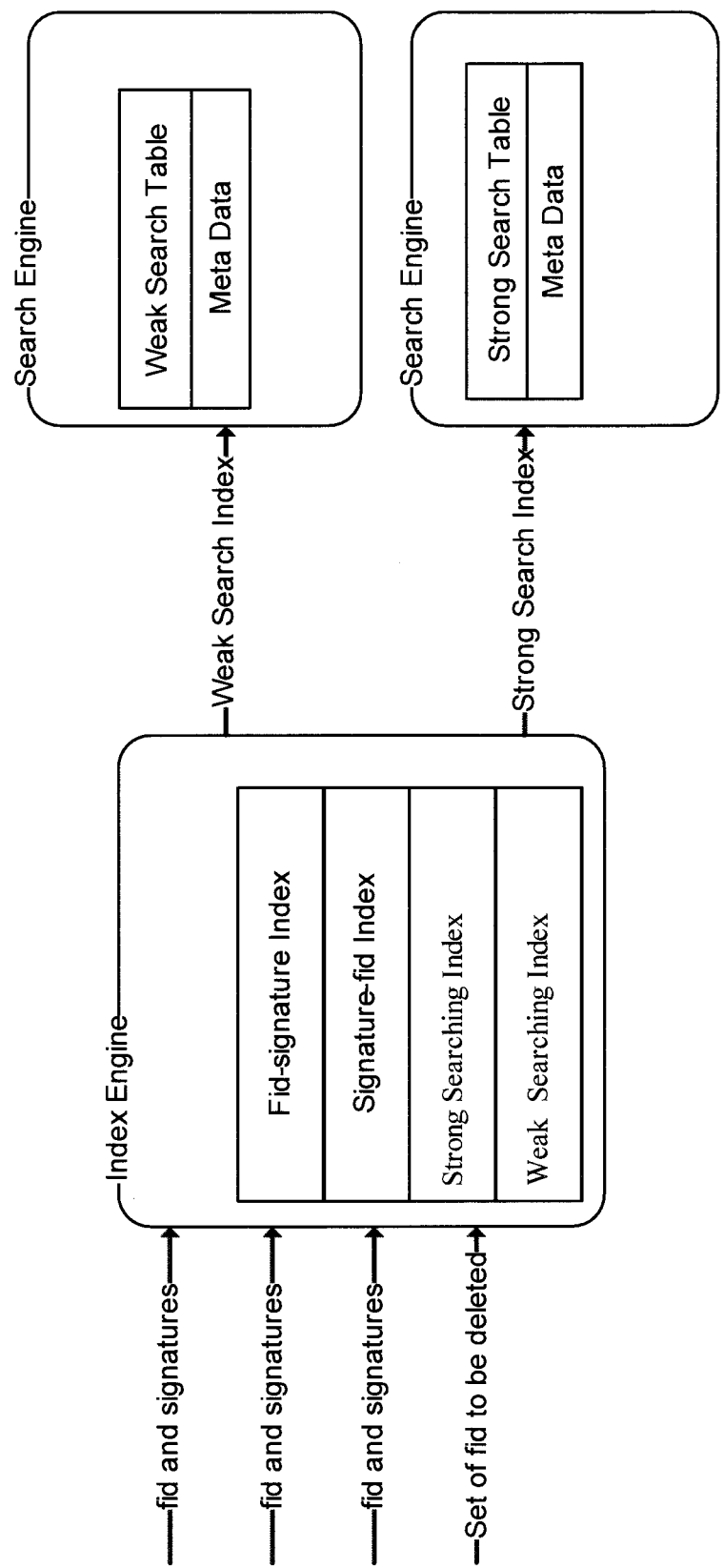
FIG. 13 shows the architecture of signature index and search in accordance with an embodiment of the invention.

FIG. 13 shows the architecture of signature index and search in accordance with an embodiment of the invention. As shown, the architecture includes an index engine and a search engine.

In this architecture, the index engine is responsible for the index lifecycle management which includes the operations such as creation/insertion/update/deletion. The index engine maintains the managing index and creates the searching indices. Hence, data stored so as to be accessible to the index engine include the fid-signature index, the signature-fid index, the strong searching index and the weak searching index.

The search engine is responsible for signature search. Each search engine uses either a weak searching index or a strong searching index. In other words, the search engine may provide weak searching by utilizing a weak search table and associated meta data or may provide strong searching by utilizing a strong search table and associated meta data. The searching index files are pushed to each client that runs the search engine. The searching index files are designed in the way for efficient incremental signature update using delta or diff technology.

Figure 14:
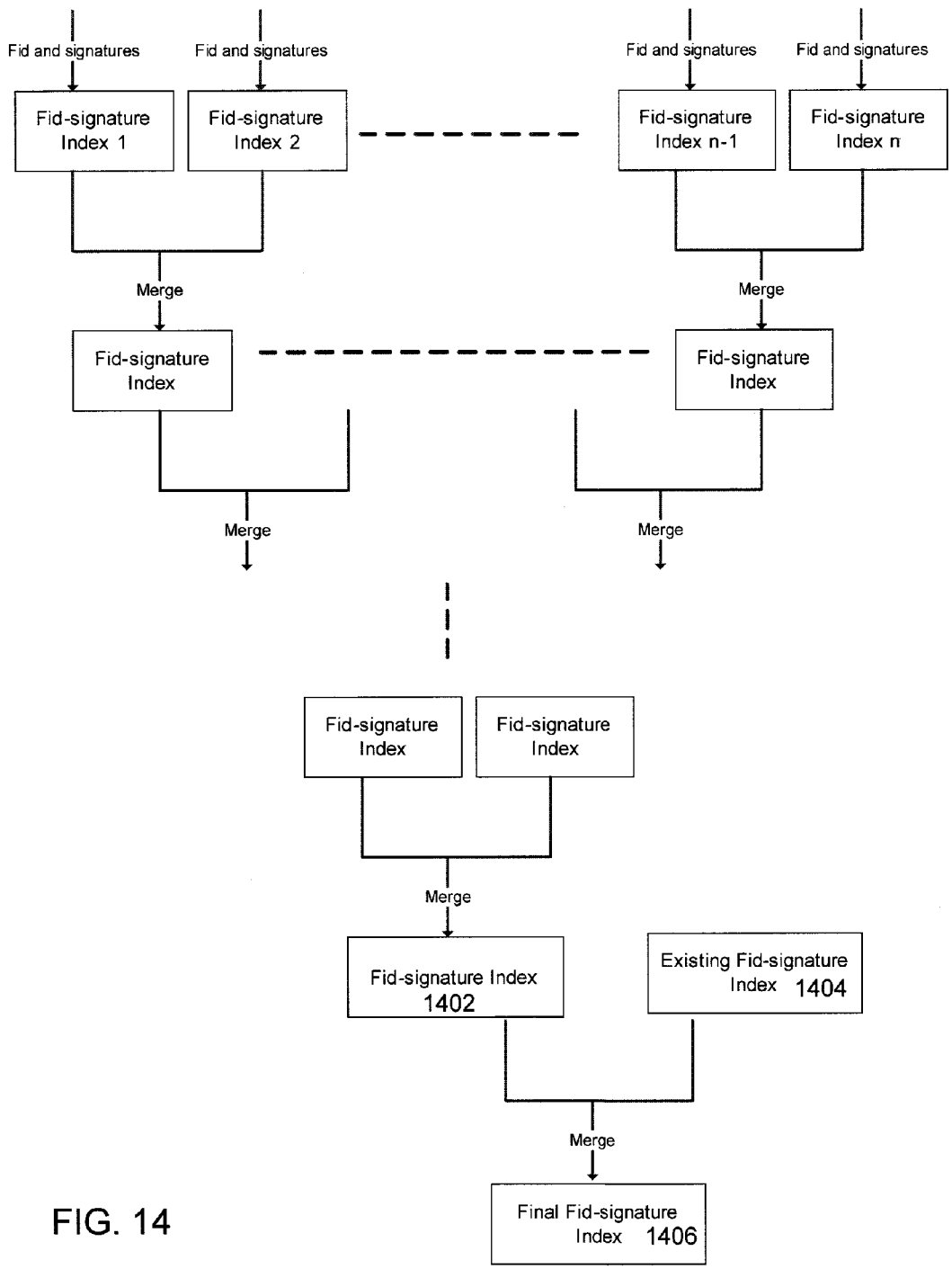
FIG. 14 depicts operations for the creation and insertion of new records into an fid-signature index in accordance with an embodiment of the invention.

Turning to FIG. 14, the index engine is configured to receive new fid and signature data and to create and insert records of that data, as appropriate, into the fid-signature index. FIG. 14 depicts the process for creating and inserting new records.

As seen, in this example, n sets of fid and signature data may be received, and fid-signature indices 1 through n may be created therefrom. (The following steps may be used to create a managing index directly from fid and signature data. First, create the fid-signature index, which includes both array of index headers and signature array, in memory and save into files. Second, create the signature-fid index from each new fid-signature index.)

These fid-signature indices may be merged pair-wise, in multiple steps as may be necessary, to create a single fid-signature index 1402. (The following steps may be used to merge two managing indices into one. First, merge two signature files into one signature file. Second, merge the two index header files into one index header file according to the new signature file. Finally, merge the two signature-fid files into one signature-fid file.) Thereafter, the single fid-signature index 1402 may be merged with the existing fid-signature index 1404 so as to generate the final (updated) fid-signature index 1406. This final merge step effectively inserts the new fid-signature data into the existing fid-signature index.

Figure 15:
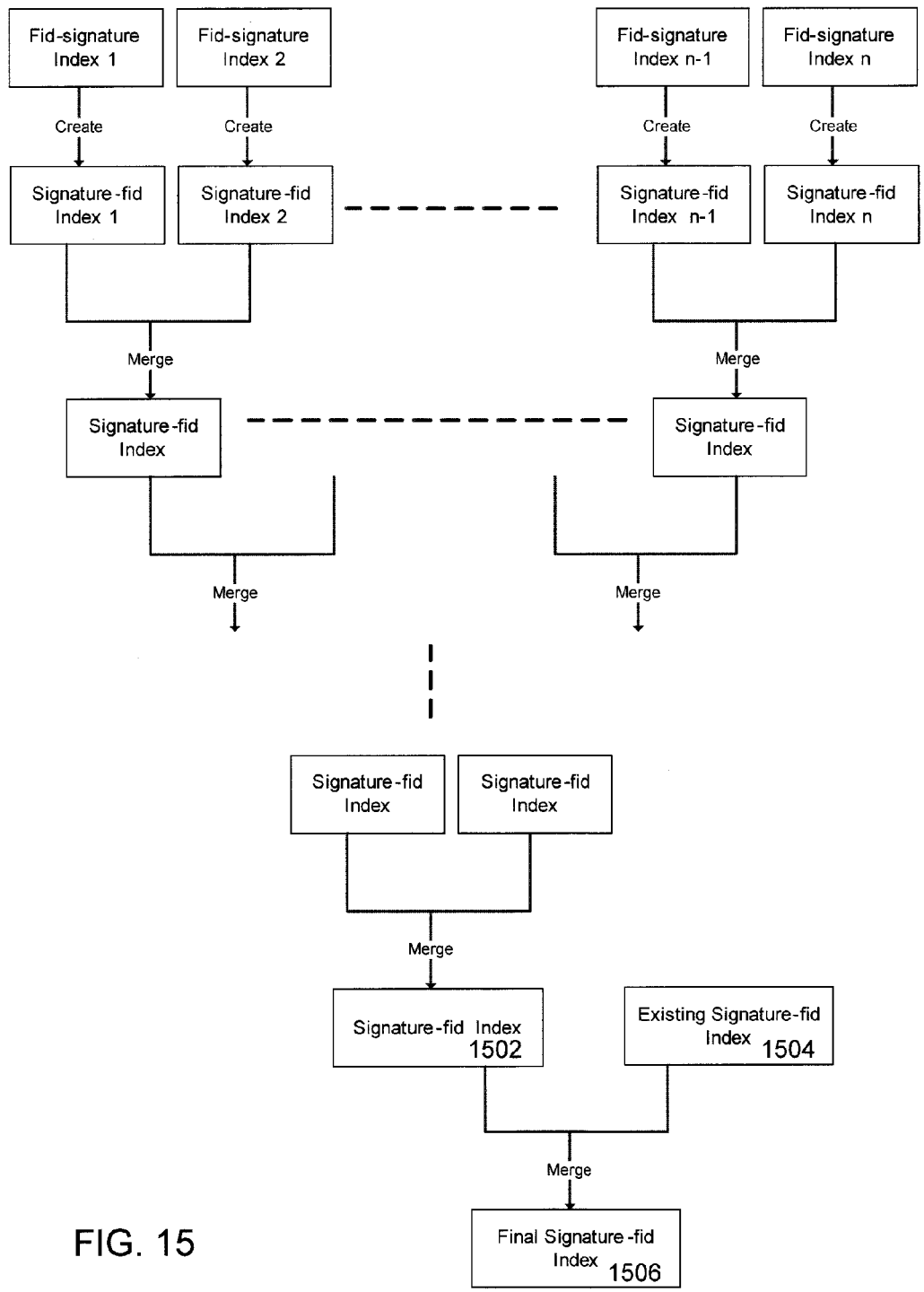
FIG. 15 depicts operations for the creation and insertion of new records into a signature-fid index in accordance with an embodiment of the invention.

In addition, the index engine is configured to receive new fid and signature data and to create and insert records of that data, as appropriate, into the signature-fid index. The process for creating and inserting new records is depicted in FIG. 15. This process may start with the fid-signature indices 1 through n which were created as shown in FIG. 14. These fid-signature indices may be each transformed so as to create corresponding signature-fid indices 1 through n. The signature-fid indices may then be merged pair-wise, in multiple steps as may be necessary, to create a single signature-fid index 1502. Thereafter, the cumulative signature-fid index 1502 may be merged with the existing signature-fid index 1504 so as to generate the final (updated) signature-fid index 1506. This final merge step effectively inserts the new signature-fid data into the existing signature-fid index.

Figure 16:
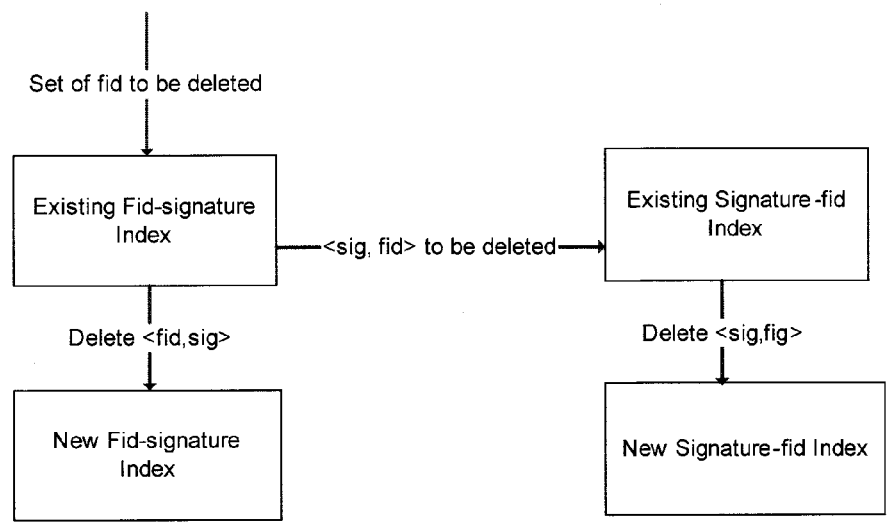
FIG. 16 shows operations for deleting existing records in accordance with an embodiment of the invention.

The index engine is further configured to receive an instruction as to a set of fids to be deleted and to delete such obsolete records of that data, as appropriate, from the fid-signature and the signature-fid indices. The process for deleting records is depicted in FIG. 16.

In one embodiment, a set of fid to be deleted is received by the index engine. The index engine then retrieves the array of relevant <fid,sig> elements from the fid-signature index of the managing index. The index engine then converts the array of relevant <fid,sig> elements into a sorted array of relevant <sig,fid> elements. The index engine may then delete all relevant <fid,sig> elements from the fid-signature index of the managing index by deleting all signatures belonging to the set of fid from the signature file and updating the index header file accordingly. This results in the new (updated) fid-signature index. Finally, the index engine deletes all relevant <sig, fid> elements from the signature-fid index. This results in the new (updated) signature-fid index.

Figure 17:
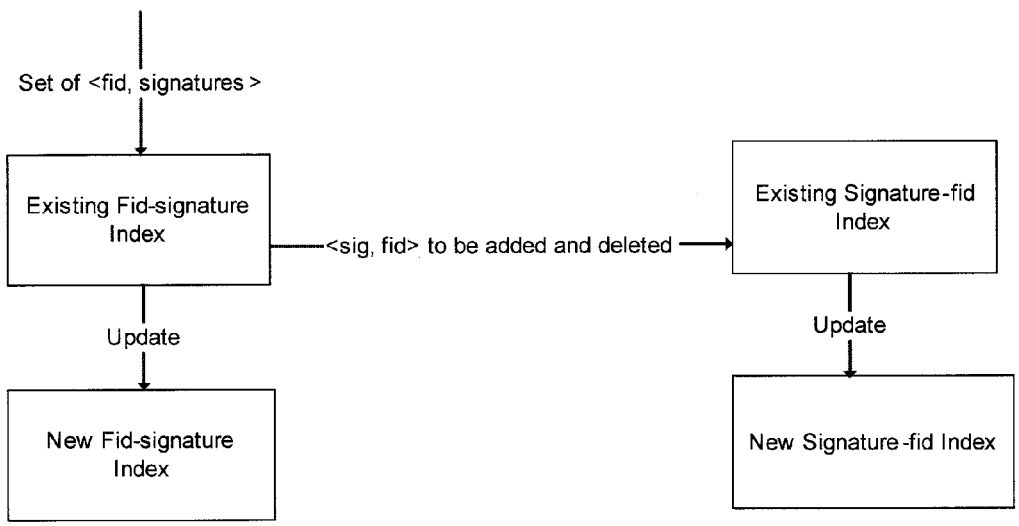
FIG. 17 shows operations for updating existing records in accordance with an embodiment of the invention.

The index engine is further configured to update existing records of data, as appropriate, in the fid-signature and signature-fid indices. The process for updating records is depicted in FIG. 17.

In one embodiment, a set of fid with their signatures to be updated is received by the index engine. This may be formed as an array A1 of <fid,sig>. The index engine retrieves an array A2 of <fid,sig> from the existing fid-signature index of the managing index. The index engine may then convert A1 and A2 into two sorted arrays of <sig,fid> which may be denoted as B1 and B2, respectively. The index engine may then update the managing index as follows: update all signatures belonging to the set of fid in the signature file (the signature array of the fid-signature index) with the information provided by A1 and A2; update the index header file accordingly; and update all relevant <sig,fid> elements in the signature-fid index with the information provided by B1 and B2.

Figure 18:
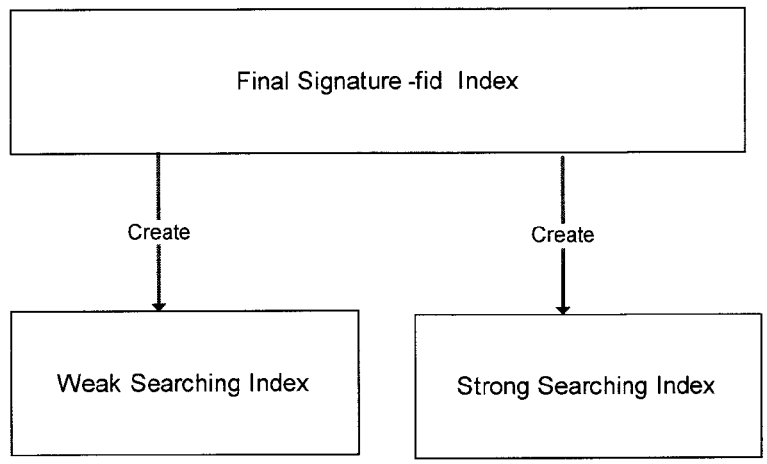
FIG. 18 depicts the creation of weak and strong searching indices in accordance with an embodiment of the invention.

Returning to FIG. 13, when the creation and/or insertion and/or deletion and/or update of the indices by the index engine is completed, then the index engine creates new (strong and weak) searching indices from the final signature-fid index. The creation of new weak and strong searching indices from the final signature-fid index is depicted in FIG. 18. It is a straightforward process.

As mentioned above, the search engine (searcher) is a separate component from the index engine (indexer). In accordance with an embodiment of the invention, the search engine may be configured to provide one of two searching operations, depending on which searching index is sent to the search engine.

Figure 19:
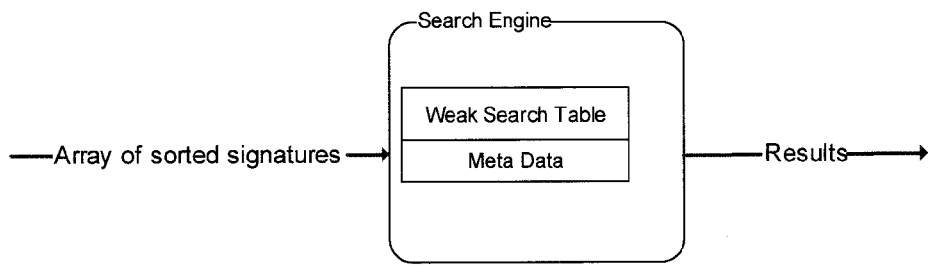
FIG. 19 depicts a weak signature search in accordance with an embodiment of the invention.

As depicted in FIG. 19, if a weak searching index is provided, then the search engine is configured to search an input array of sorted signatures based on the weak searching index. When an array of sorted signatures is searched against the weak search table, the search engine first determines to which sub-space (block) each signature belongs based on the first two bytes. For all signatures in the same sub-space, the search engine uses the meta-data to go directly to the corresponding block in the sorted signature array and execute a multiple value binary search (MVBS) within the block.

The procedure for a weak signature search may be outlined as follows. First, the search engine receives an array of sorted signatures as input. The signatures of the input signature array are assigned into sub-spaces based on the first two bytes of each signature. Then, each sub-space may be processed (walked through) with the following steps.

For all target signatures in this sub-space (the target array S), which is again an array of sorted signatures, by using meta-data, the search engine may identify an array B of sorted signatures that belongs to the corresponding block from the weak table. The array B is loaded into memory from the file. The loading may be performed using only one input/output (I/O) operation.

The search engine may then search the target array S against the reference array B by applying the MVBS algorithm.

Figure 20:
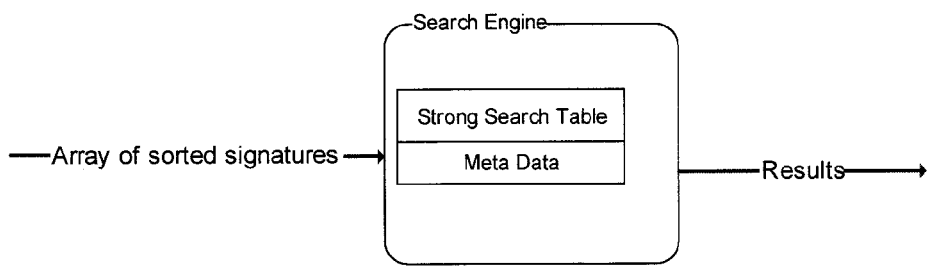
FIG. 20 depicts a strong signature search in accordance with an embodiment of the invention.

As depicted in FIG. 20, if a strong searching index is provided, then the search engine is configured to search an input array of sorted signatures based on the strong searching index. For each signature, the block containing it can be determined based on its first two bytes, and then the MVBS algorithm is performed within the block. If the signature is found in a cell, then the neighboring cells are checked so as to find all the instances of the signature and get all fids to which the signature belongs. This is done due to the possible duplication of the signatures in the strong search table. This strong search procedure is advantageously efficient.

As discussed above, to support the index engine and/or the search engine, a multiple value binary search may be utilized.

Multiple Value Search Problem: Assume that one has an array of sorted items R[1, . . . , N] named as reference list, and an array of sorted items T[1, . . . , M] names as target list, both in strictly ascending order, one needs to find all items of target list T from the reference list R. The results are stored into a list S[1, . . . , K].

First solution: Inputs are the sorted reference list R[1, . . . , N] and the target list T[1, . . . , M]. For each element t in the target list T[1, . . . , M], a regular binary search is applied against the reference list R to determine whether t belongs to R. Hence, a regular binary search is applied M times against a reference list of size N. Applicants have determined that this first solution is inefficient.

Second solution: Again, inputs are the sorted reference list R[1, . . . , N] and the target list T[1, . . . , M]. This solution is an iterative process starting from binary searching the first element T[1] against R. If T[1] exists in R, any element of R less than T[1] is removed from the reference list for the next search. Otherwise, the reference list R is not changed. The procedure then continues to the next element T[2] and so on with the same reference updating mechanism. See "Multiple Values Search Algorithm," by Muhammad Sharif and Aman Ullah Khan, *Journal of Information & Communication Technology*, Vol. 1, No. 2 (Fall 2007), pp. 49-58. Applicants have determined that this solution is generally more efficient than the first solution in that the size of the reference list becomes smaller after each successful search.

The present application discloses the following new solution to the multiple value binary search (MVBS) problem. This innovative solution has the advantage of dual binary searching with respect to both the target list and the reference list. Hence, this third solution may be referred to as a multi-value dual binary search. In contrast, the second solution performs solo binary searching in regard only to its reference list. When our third solution searches for each element of T from R, its reference list has a smaller size than the corresponding reference list of the second solution. Based on our testing, our multi-value dual binary search procedure is more efficient than the second solution, especially for a very large reference list.

In one embodiment, our procedure starts with an empty list S. The step performed is K=MVB-SEARCH(S, R[1, . . . , N], T[1, . . . , M]), and the output is K and S. MVB-SEARCH is a recursive function which returns the total number of matched items with the following prototype and logic.

```
MVB-SEARCH(S,R[L1,...,H1], T[L2,...,H2] )
BEGIN
    IF L2>H2 THEN RETURN 0
    ## We take truncated value for the following value
    M2 = (L2 + H2)/2
    L=L1
```

-continued

```
    H=H1
    WHILE (L≦H ) DO
        BEGIN
            ## We take truncated value for the following value
            M1=(L+H)/2
            IF T[M2]>R[M1] THEN L=M1+1
            ELSE IF T[M2]<R[M1] THEN H=M1−1
            ELSE
                BEGIN
                    ADD T[M2] TO S
                    V=1+MVB-SEARCH(S,R[L1,...,M1−1], T[L2,...,M2−1])
                    V=V+ MVB-SEARCH(S,R[M1+1,...,H1], T[M2+1,...,H2])
                    RETURN V
                END ELSE
        END WHILE
        V=MVB-SEARCH(S,R[L1,...,H], T[L2,...,M2−1])
        V=V+ MVB-SEARCH(S,R[L,...,H1], T[M2+1,...,H2])
        RETURN V
END MVB-SEARCH
```

The following is a function for MVB-Search as implemented in the C programming language.

```
int mv_bsearch(int*R,int s1,int e1,int*T,int s2,int e2){
    int m1,m2;
int s,e;
    if(s2>e2) return 0;
    m2=(s2+e2)/2;
    s=s1;
    e=e1;
    while(s<=e) {
    m1=(s+e)/2;
    if(T[m2]>R[m1]) s=m1+1;
    else if(T[m2]<R[m1]) e=m1−1;
    else {
        printf("T[% d]=% d is in reference list\n",m2,T[m2]);
        return 1+mv_bsearch(R,s1,m1−1,T,s2,m2−1)
            +mv_bsearch(R,m1+1,e1,T,m2+1,e2);
        }
}
    return mv_bsearch(R,s1,e,T,s2,m2−1)+mv_bsearch(R,s,e1,T,m2+1,e2);
}
```

Computer Apparatus

Figure 21:
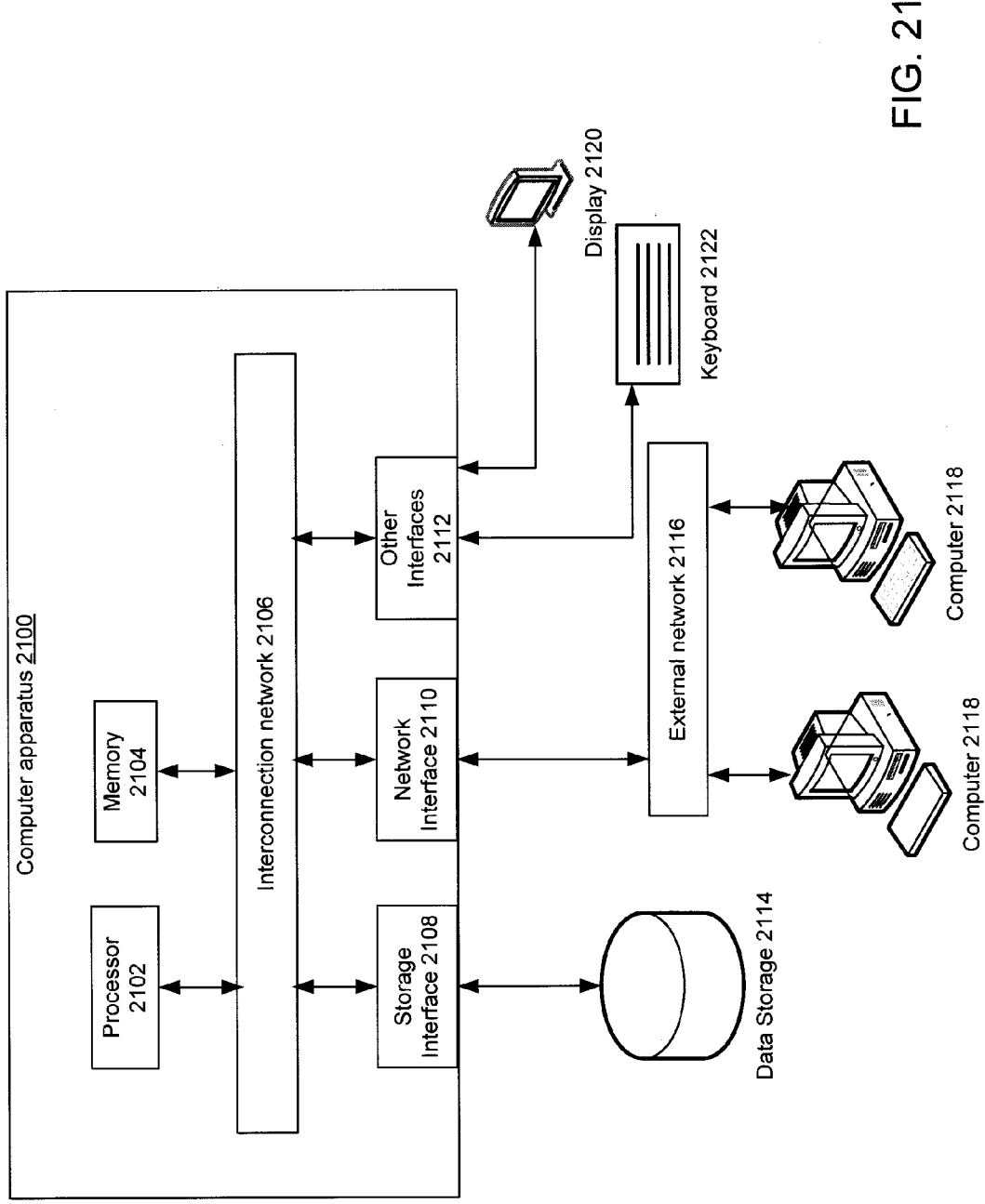
FIG. 21 is a schematic diagram depicting an example computer apparatus 700 which may be configured to perform various method steps in accordance with an embodiment of the invention.

FIG. 21 is a schematic diagram depicting an example computer apparatus 2100 which may be configured to perform various method steps in accordance with an embodiment of the invention. Other designs for the computer apparatus may be used in alternate embodiments. As discussed above, embodiments of the present invention may be performed by multiple computer apparatus 2100 communicatively interconnected by a network.

As shown in FIG. 21, the computer apparatus 2100 comprises a processor 2102, a computer-readable memory system 2104, a storage interface 2108, a network interface 2110, and other interfaces 2112. These system components are interconnected through the use of an interconnection network (such as a system bus or other interconnection system) 2106. The memory 2104 may be configured to include, in addition to other components and data, processor-executable instructions to perform various method steps disclosed herein.

The storage interface 2108 may be used to connect storage devices 2114 to the computer apparatus 2100. The network interface 2110 may be used to communicate with other computers 2118 by way of an external network 2116. The other interfaces may interface to various devices, for example, a display 2120, a keyboard 2122, and other devices.

CONCLUSION

The features and advantages described in the specification provide a beneficial use to those making use of a system and a method as described in embodiments herein. For example, a user is provided mechanisms, e.g., by receiving and/or transmitting control signals, to control access to particular information as described herein. Further, these benefits accrue regardless of whether all or portions of components, e.g., server systems, to support their functionality are located locally or remotely relative to the user.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using one or more hardware elements. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. The embodiments are not limited in this context.

Various embodiments may be implemented using one or more software elements. In general, a software element may refer to any software structures arranged to perform certain operations. In one embodiment, for example, the software elements may include program instructions and/or data adapted for execution by a hardware element, such as a processor. Program instructions may include an organized list of commands comprising words, values or symbols arranged in a predetermined syntax, that when executed, may cause a processor to perform a corresponding set of operations.

The software may be written or coded using a programming language. Examples of programming languages may include C, C++, BASIC, Perl, Matlab, Pascal, Visual BASIC, JAVA, ActiveX, assembly language, machine code, and so forth. The software may be stored using any type of computer-readable media or machine-readable media. Furthermore, the software may be stored on the media as source code or object code. The software may also be stored on the media as compressed and/or encrypted data. Examples of software may include any software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. The embodiments are not limited in this context.

Some embodiments may be implemented, for example, using any computer-readable media, machine-readable media, or article capable of storing software. The media or article may include any suitable type of memory unit, memory device, memory article, memory medium, storage device, storage article, storage medium and/or storage unit, such as any of the examples described with reference to a memory. The media or article may comprise memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), subscriber identify module, tape, cassette, or the like. The instructions may include any suitable type of code, such as source code, object code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, JAVA, ActiveX, assembly language, machine code, and so forth. The embodiments are not limited in this context.

Upon reading this disclosure, those of skill in the art will appreciate still additional alternative structural and functional designs for a system and a process for a matching engine to query relevant documents, which may include a signature generation and relevance detection through the disclosed principles herein. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A computer apparatus for managing an index of documents in a document repository, the apparatus comprising:
    data storage configured to store computer-readable instructions and data;
    a processor configured to execute computer-readable instructions and to access said data storage;
    a file identifier-signature index stored on the data storage, wherein the file identifier-signature index comprises index headers and a signature array, wherein each index header comprises a file identifier for a document file in the document repository, a number of signatures associated with the file identifier, and start and end positions of a block storing the associated signatures in the signature array, wherein the signature array comprises an array of signatures generated from document files in the document repository, and wherein the index headers of the file identifier-signature index are sorted in order by the file identifiers; and
    a signature-file identifier index stored on the data storage, wherein the signature-file identifier index comprises signature and file identifier data pairs, wherein the signature and file identifier data pairs of the signature-file identifier index are sorted in order by the signatures;
    a weak searching index comprising weak search table meta data and a sorted signature array, wherein the signature array is sorted in order by values of the signatures and organized into signature blocks depending on values of a first plurality of bytes of the signatures, and wherein the weak search table meta data includes start and end positions of the signature blocks; and
    a strong searching index comprising strong search table meta data and a sorted element array, wherein each element of the sorted element array includes a signature and associated file identifier fields, wherein the element array is sorted in order by the values of the signatures and organized into signature blocks depending on the values of the first plurality of bytes of the signatures, and wherein the strong search table meta data includes the start and end positions of the signature blocks.

2. The computer apparatus of claim 1, wherein the signature array of the file identifier-signature index is grouped by file identifier and sorted in ascending order of file identifier.

3. The computer apparatus of claim 1, further comprising:
    computer-readable program code configured to create and insert new records into the file identifier-signature index by merging a new file identifier-signature index with an existing file identifier-signature index.

4. The computer apparatus of claim 3, further comprising:
    computer-readable code configured to receive file identifiers to be deleted and to remove corresponding entries from said file identifier-signature and signature-file identifier indices.

5. The computer apparatus of claim 4, further comprising:
    computer-readable code configured to receive file identifiers and associated signatures to be updated and to update corresponding entries from said file identifier-signature and signature-file identifier indices.

6. The computer apparatus of claim 1, further comprising:
    computer-readable code configured to generate both the weak searching index and the strong searching index and to send one of said searching indices to each searching engine.

7. The computer apparatus of claim 1, wherein each element includes a signature and two associated file identifier fields, and wherein a signature is in more than one element if the signature has more than two associated file identfiers.

8. A computer apparatus for determining whether an input document matches any document in a set of documents, the apparatus comprising:
    data storage configured to store computer-readable instructions and data;
    a processor configured to execute computer-readable instructions and to access said data storage;
    computer-readable code configured to implement a search engine which is configured to apply a weak search if configured with a weak searching index from an index engine and to apply a strong search if configured with a strong searching index from the index engine, wherein both the weak and strong searching indices are derived from the set of documents, wherein the weak searching index comprises weak search table meta data and a sorted signature array, wherein the signature array is sorted in order by values of the signatures and organized into signature blocks depending on values of a first plurality of bytes of the signatures, and wherein the weak search table meta data includes start and end positions of the signature blocks, further wherein the strong searching index comprises strong search table meta data and a sorted element array, wherein each element of the sorted element array includes a signature and associated file identifier fields, wherein the element array is sorted in order by values of the signatures and organized into signature blocks depending on the values of the first plurality of bytes of the signatures, and wherein the strong search table meta data includes the start and end positions of the signature blocks.

9. The apparatus of claim 8, wherein each element includes a signature and two associated file identifier fields, and wherein a signature is in more than one element if the signature has more than two associated file identifiers.

10. The apparatus of claim 9, further comprising:
   computer-readable code to implement a multiple value binary search by the searching engine.

11. The apparatus of claim 10, wherein the multiple value binary search comprises a multi-value dual binary search which performs dual binary searching with respect to both a target list and a reference list.

* * * * *